United States Patent
Kim et al.

(10) Patent No.: US 12,363,663 B2
(45) Date of Patent: *Jul. 15, 2025

(54) METHOD AND APPARATUS FOR TRANSMITTING AND RECEIVING PDCCH IN WIRELESS COMMUNICATION SYSTEM

(71) Applicant: LG ELECTRONICS INC., Seoul (KR)

(72) Inventors: Seonwook Kim, Seoul (KR); Suckchel Yang, Seoul (KR); Seunghwan Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/381,000

(22) Filed: Oct. 17, 2023

(65) Prior Publication Data
US 2024/0049155 A1   Feb. 8, 2024

Related U.S. Application Data

(63) Continuation of application No. 18/099,088, filed on Jan. 19, 2023, now Pat. No. 11,844,039, which is a
(Continued)

(30) Foreign Application Priority Data

Aug. 5, 2021  (KR) .......................... 10-2021-0103185
Sep. 29, 2021 (KR) .......................... 10-2021-0129129

(51) Int. Cl.
 *H04W 56/00* (2009.01)
 *H04W 72/23* (2023.01)
 *H04L 27/26* (2006.01)

(52) U.S. Cl.
 CPC ....... *H04W 56/0015* (2013.01); *H04W 72/23* (2023.01); *H04L 27/26025* (2021.01)

(58) Field of Classification Search
 None
 See application file for complete search history.

(56) References Cited

U.S. PATENT DOCUMENTS

2019/0098590 A1* 3/2019 Nam ..................... H04W 72/23
2019/0327767 A1* 10/2019 Islam .................... H04L 5/0094
(Continued)

OTHER PUBLICATIONS

5G; NR; Physical layer procedures for control (3GPP TS 38.213 version 16.3.0 Release 16), ETSI TS 138 213 v16.3.0 (Nov. 2020), 181 pages, Nov. 2020.
(Continued)

*Primary Examiner* — Clemence S Han
(74) *Attorney, Agent, or Firm* — BRYAN CAVE LEIGHTON PAISNER LLP

(57) ABSTRACT

A method and an apparatus for transmitting and receiving a physical downlink control channel (PDCCH) in a wireless communication system are disclosed. A method of receiving a physical downlink control channel (PDCCH) according to an aspect of the present disclosure may include: receiving, from a base station, a synchronization signal/physical broadcast channel (SS/PBCH) block including a primary synchronization signal (PSS), a secondary synchronization signal (SSS) and a PBCH; and receiving, from the base station, the PDCCH on a PDCCH monitoring occasion determined based on a master information block (MIB) in the SS/PBCH block.

10 Claims, 17 Drawing Sheets

Related U.S. Application Data continuation of application No. PCT/KR2022/010455, filed on Jul. 18, 2022.

(56) References Cited

U.S. PATENT DOCUMENTS

| | | | |
|---|---|---|---|
| 2020/0053670 A1* | 2/2020 | Jung | H04W 56/0015 |
| 2020/0244530 A1* | 7/2020 | Lin | H04W 72/23 |
| 2021/0007066 A1* | 1/2021 | Lin | H04W 76/11 |
| 2021/0099981 A1* | 4/2021 | Cirik | H04W 72/23 |
| 2022/0007399 A1* | 1/2022 | Rastegardoost | H04L 5/0055 |
| 2022/0053522 A1* | 2/2022 | MolavianJazi | H04W 72/1263 |
| 2022/0263619 A1* | 8/2022 | Si | H04L 5/0053 |
| 2023/0050703 A1* | 2/2023 | Harada | H04W 72/30 |
| 2023/0059563 A1* | 2/2023 | Harada | H04L 5/0048 |
| 2023/0146004 A1* | 5/2023 | Niu | H04L 5/0094 370/329 |
| 2023/0319816 A1* | 10/2023 | Ali | H04L 27/26025 370/329 |
| 2024/0056272 A1* | 2/2024 | Okano | H04W 72/04 |
| 2024/0267832 A1* | 8/2024 | Jiang | H04W 72/12 |

OTHER PUBLICATIONS

Qualcomm Incorporated "Initial access aspects for NR to support operation between 52.6 GHZ and 71 Ghz," 3GPP TSG RAN WG1 #105-e, R1-2104659, 21 pages, May 2021.

* cited by examiner

METHOD AND APPARATUS FOR TRANSMITTING AND RECEIVING PDCCH IN WIRELESS COMMUNICATION SYSTEM

CROSS-REFERENCE TO RELATED APPLICATIONS

This application is a Continuation of U.S. application Ser. No. 18/099,088, filed on Jan. 19, 2023, which is a Continuation Bypass of International Application No. PCT/KR2022/010455, filed on Jul. 18, 2022, which claims the benefit of earlier filing date and right of priority to Korean Application No. 10-2021-0103185, filed on Aug. 5, 2021, No. 10-2021-0129129, filed on Sep. 29, 2021, the contents of which are all hereby incorporated by reference herein in their entirety.

TECHNICAL FIELD

The present disclosure relates to a wireless communication system, and in more detail, relates to a method and an apparatus of transmitting and receiving a physical downlink control channel (PDCCH) in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus of transmitting and receiving a PDCCH.

In addition, an additional technical object of the present disclosure is to provide a method and an apparatus of transmitting and receiving a PDCCH when a synchronization signal/physical broadcast channel (SS/PBCH) block and a PDCCH subcarrier interval are configured to be large.

In addition, an additional technical object of the present disclosure is to provide a method and an apparatus of configuring time resources of an SS/PBCH block, a control resource set (CORESET) index 0, and a default PDSCH.

The technical objects to be achieved by the present disclosure are not limited to the above-described technical objects, and other technical objects which are not described herein will be clearly understood by those skilled in the pertinent art from the following description.

Technical Solution

A method of receiving a physical downlink control channel (PDCCH) in a wireless communication system according to an aspect of the present disclosure, the method performed by a terminal may include: receiving, from a base station, a synchronization signal/physical broadcast channel (SS/PBCH) block including a primary synchronization signal (PSS), a secondary synchronization signal (SSS) and a PBCH; and receiving, from the base station, the PDCCH on a PDCCH monitoring occasion determined based on a master information block (MIB) in the SS/PBCH block. Based on i) information for determining the PDCCH monitoring occasion in the MIB and ii) {subcarrier spacing (SCS) of the SS/PBCH block, SCS of the PDCCH}, a value of a first parameter used to determine the PDCCH monitoring occasion may be configured among candidate values of the first parameter, and depending on whether {SCS of the SS/PBCH block, SCS of the PDCCH} is {480, 480} kHz or {960, 960} kHz, some candidate values of the candidate values of the first parameter may be defined differently.

A method of transmitting a physical downlink control channel (PDCCH) in a wireless communication system according to an additional aspect of the present disclosure, the method performed by a base station may include: transmitting, to a terminal, a synchronization signal/physical broadcast channel (SS/PBCH) block including a primary synchronization signal (PSS), a secondary synchronization signal (SSS) and a PBCH; and transmitting, to the terminal, the PDCCH on a PDCCH monitoring occasion determined based on a master information block (MIB) in the SS/PBCH block. Based on i) information for determining the PDCCH monitoring occasion in the MIB and ii) {subcarrier spacing (SCS) of the SS/PBCH block, SCS of the PDCCH}, a value of a first parameter used to determine the PDCCH monitoring occasion may be configured among candidate values of the first parameter, and depending on whether {SCS of the SS/PBCH block, SCS of the PDCCH} is {480, 480} kHz or {960, 960} kHz, some candidate values of the candidate values of the first parameter may be defined differently.

Advantageous Effects

According to an embodiment of the present disclosure, efficient channel transmission and reception related to initial access can be supported in an unlicensed band.

In addition, according to an embodiment of the present disclosure, as subcarrier spacing of an SS/PBCH block and a PDCCH are configured to be large, a relative distance between the SS/PBCH block and a PDCCH monitoring occasion can be reduced to support efficient channel transmission and reception related to initial access.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
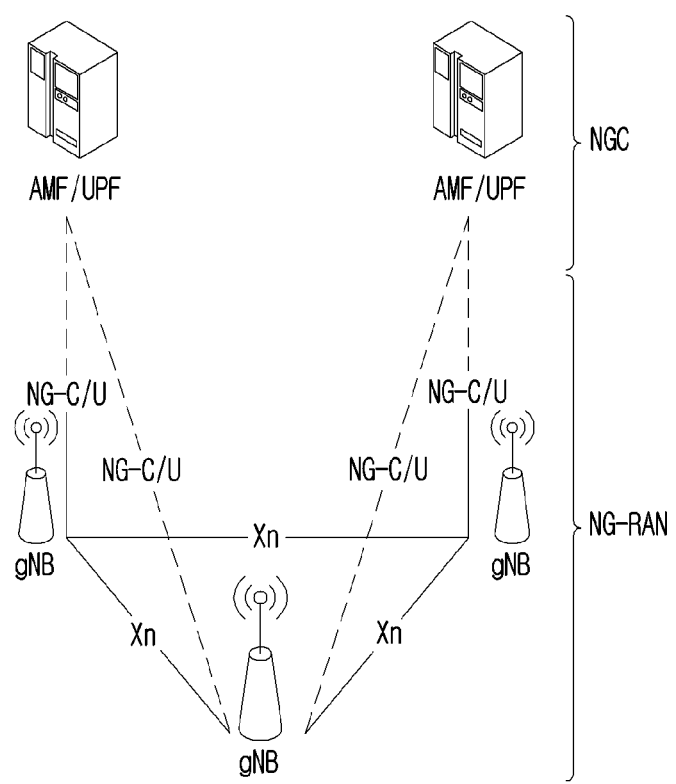
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
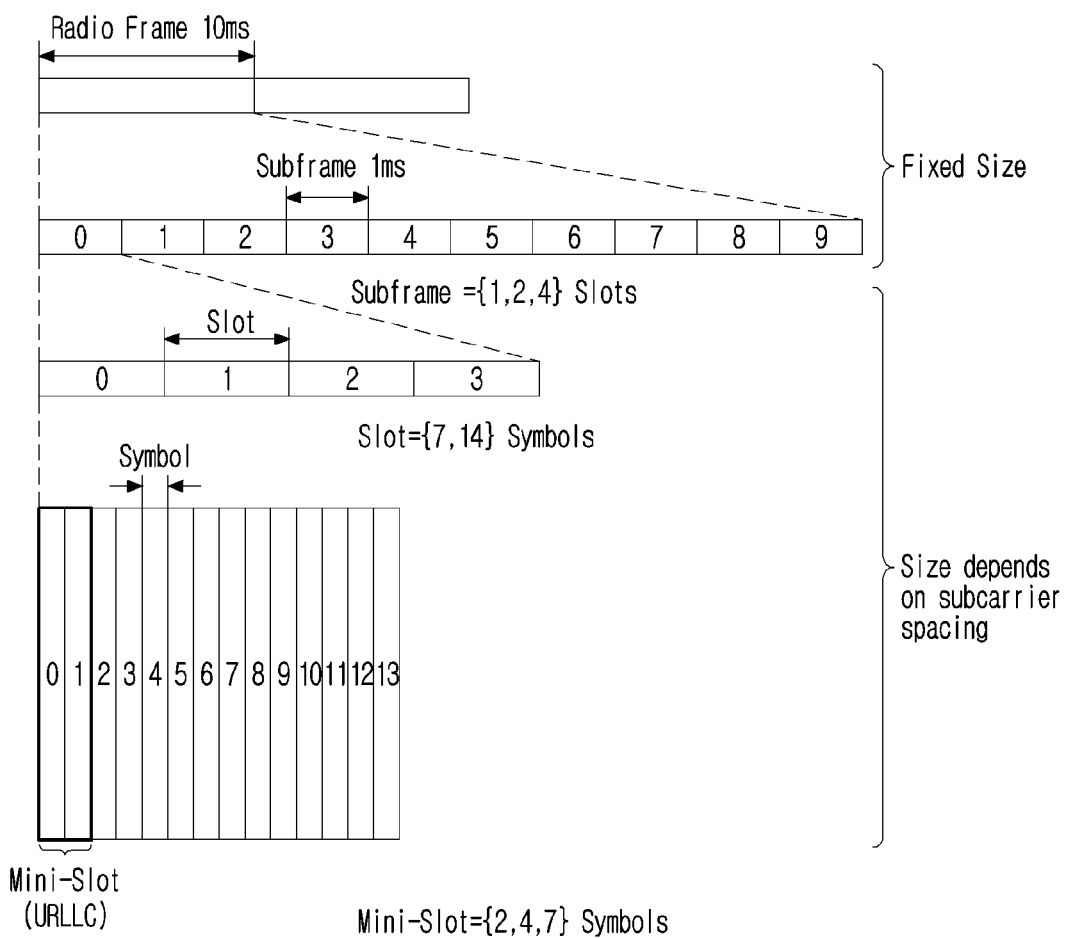
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu} - 1\}$ in a subframe and are numbered in an increasing order of $n_{s,f}^\mu \in \{0, \ldots, N_{slot}^{frame,\mu} - 1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
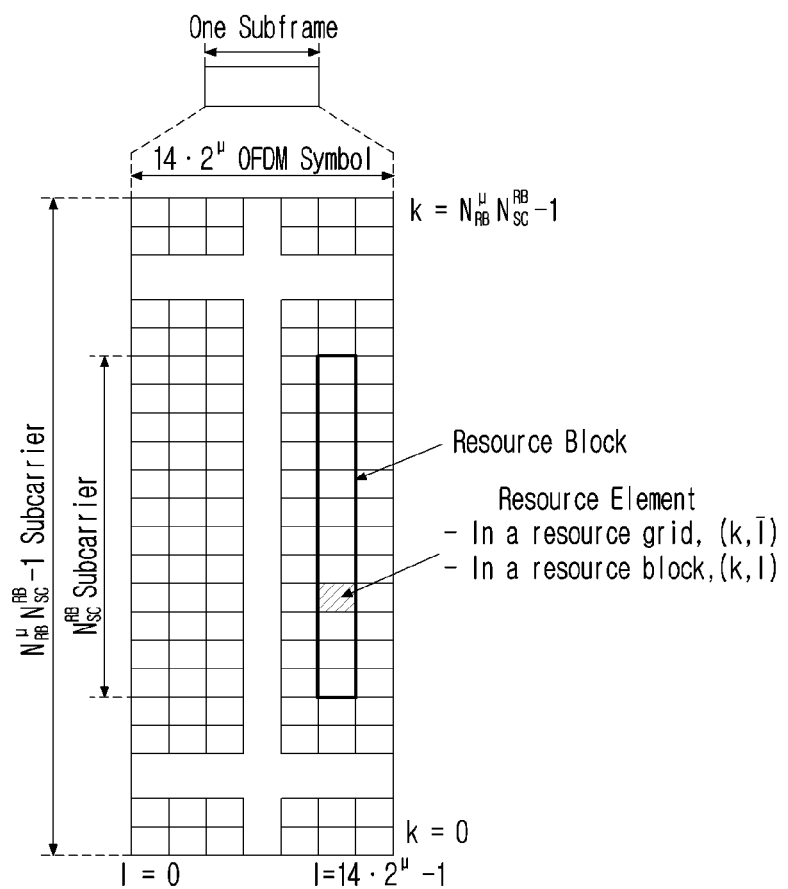
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k, l'). Here, k=0, . . . , $N_{RB}^{\mu}N_{sc}^{RB}-1$ is an index in a frequency domain and l'=0, . . . , $2^{\mu}N_{symb}^{(\mu)}-1$ refers to a position of a symbol in a subframe. When referring to a resource element in a slot, an index pair (k,l) is used. Here, l=0, . . . , $N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration p is identical to 'point A'. A relationship between a common resource block number $n_{CRB}^{\mu}$ and a resource element (k,l) for a subcarrier spacing configuration P in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
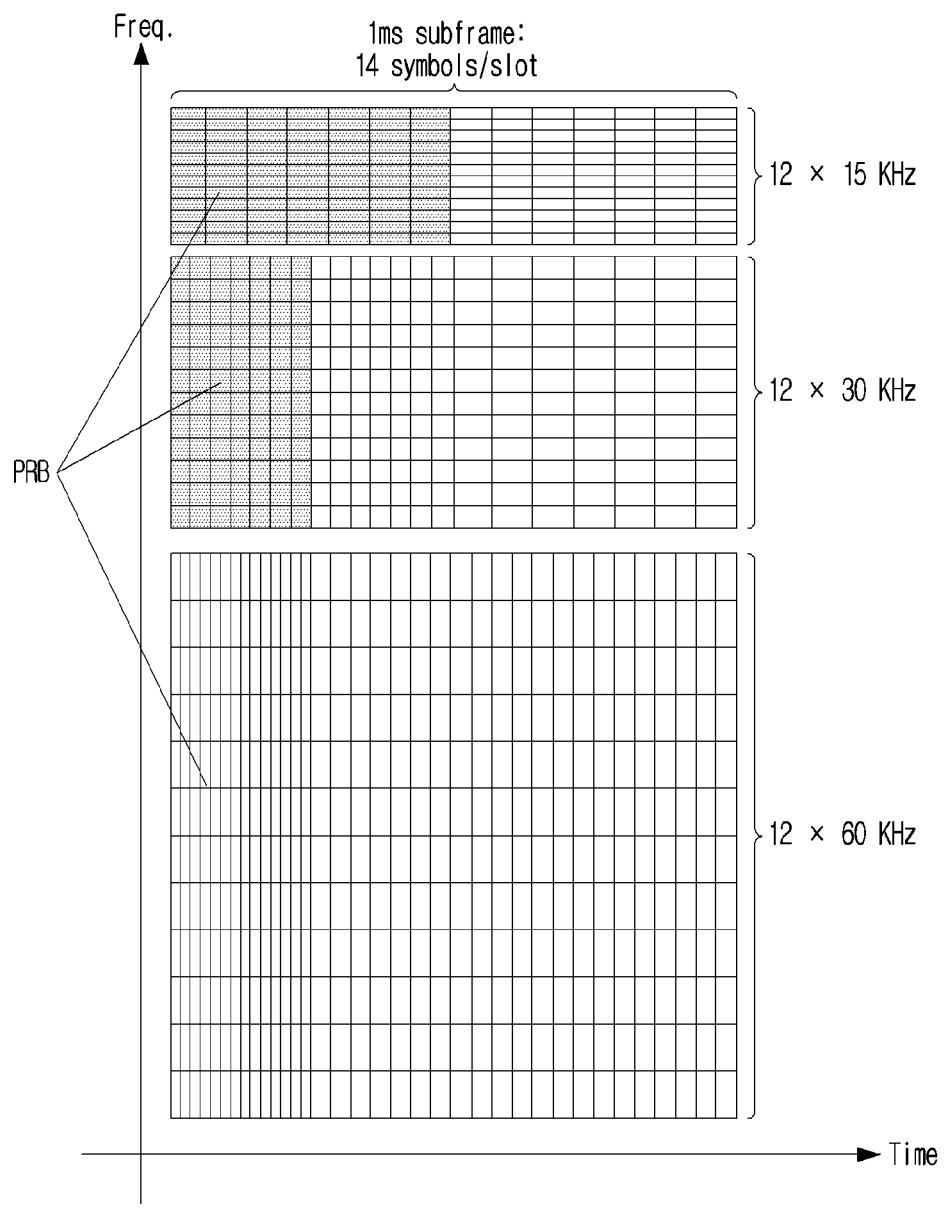
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
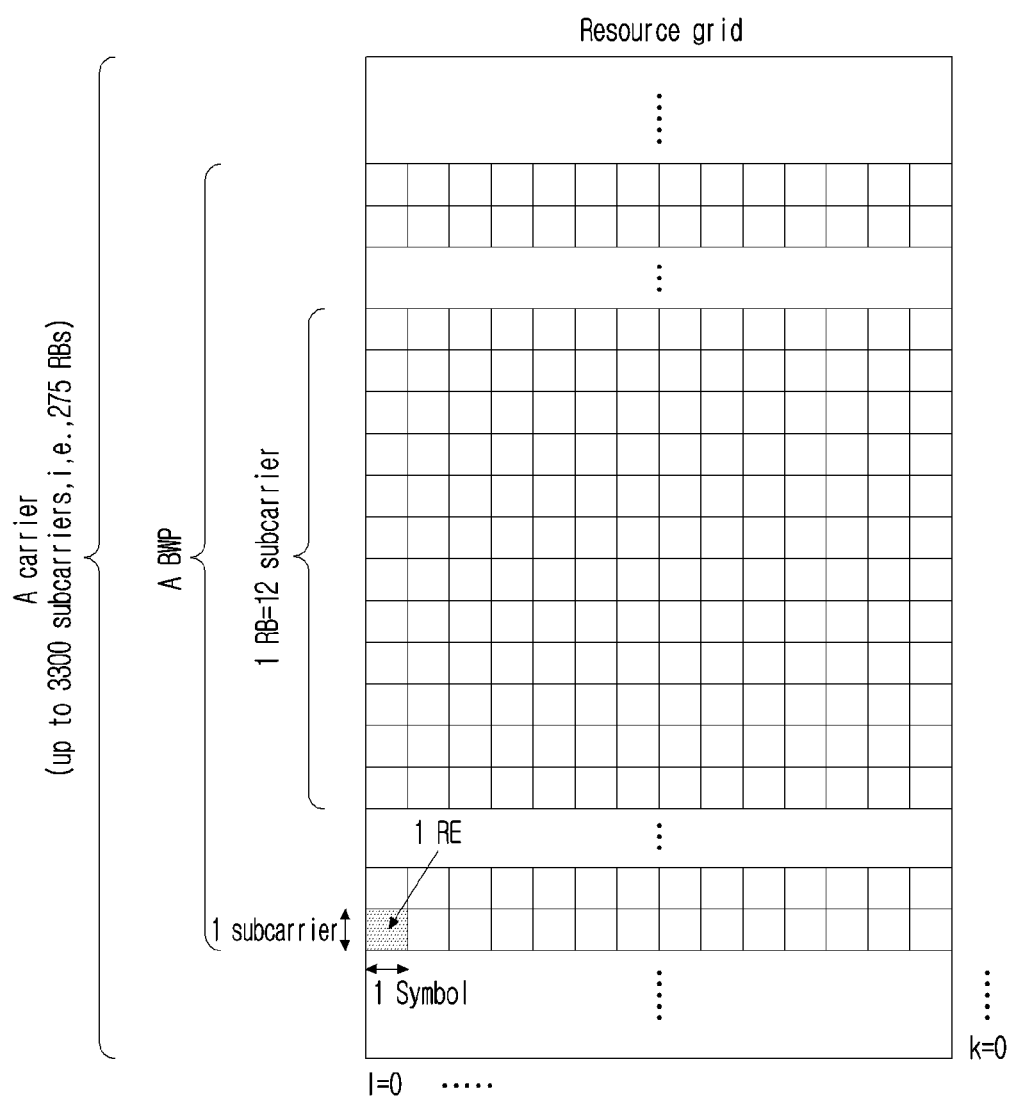
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
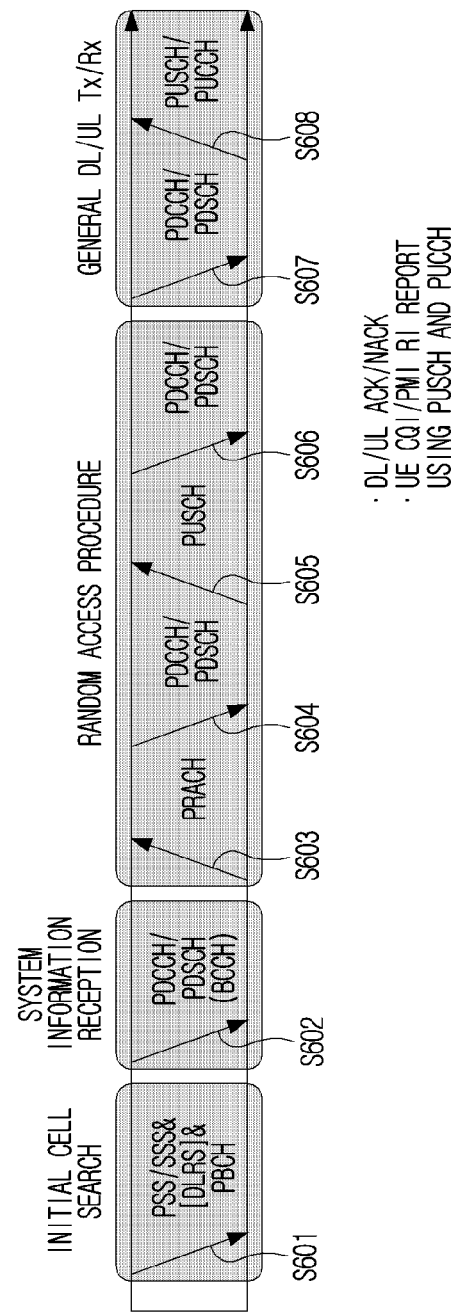
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 01 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Synchronization Signal Block (SSB) Transmission and Related Operations

A terminal may perform cell search, system information acquisition, beam alignment for initial access, DL measurement, etc. based on a synchronization signal block (SSB). An SSB may be referred to as a synchronization signal/physical broadcast channel (SS/PBCH) block.

Figure 7:
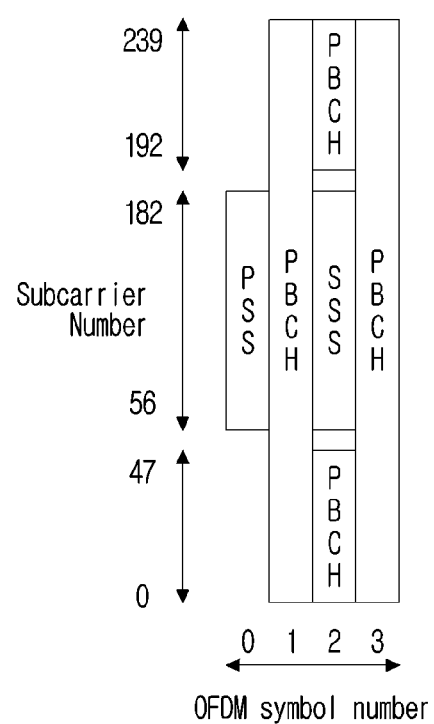
FIG. 7 illustrates an SSB structure in a wireless communication system to which the present disclosure may be applied.

FIG. 7 illustrates an SSB structure in a wireless communication system to which the present disclosure may be applied.

Referring to FIG. 7, an SSB is composed of a PSS, an SSS, and a PBCH. An SS/PBCH block is composed of four consecutive OFDM symbols, and a PSS, a PBCH, an SSS/PBCH, and a PBCH are transmitted for each OFDM symbol. Each of a PSS and an SSS is composed of 1 OFDM symbol and 127 subcarriers, and a PBCH is composed of 3 OFDM symbols and 576 subcarriers. Polar coding and Quadrature Phase Shift Keying (QPSK) are applied to a PBCH. A PBCH is composed of a data RE and a demodulation reference signal (DMRS) RE for each OFDM symbol. 3 DMRS REs exist for each RB, and 3 data REs exist between DMRS REs.

Hereinafter, cell search will be described.

Cell search means a process in which a terminal acquires time/frequency synchronization of a cell and detects a cell identifier (ID) (e.g., physical layer cell ID (PCID)) of the cell. A PSS is used to detect a cell ID in a cell ID group, and an SSS is used to detect a cell ID group. A PBCH is used for SSB (time) index detection and half-frame detection.

A cell search process of a terminal may be summarized as shown in Table 6 below.

TABLE 6

| | Type of signals | Operations |
|---|---|---|
| First step | PSS | * SS/PBCH block (SSB) symbol timing acquisition<br>* Cell ID detection within a cell ID group<br>(3 hypothesis) |
| Second step | SSS | * Cell ID group detection (336 hypothesis) |
| Third step | PBCH DMRS | * SSB index and half frame (HF) index (Slot and frame boundary detection) |
| Fourth step | PBCH | * Time information (80 ms, system frame number (SFN), SSB index, HF)<br>* Remaining minimum system information (RMSI) control resource set (CORESET)/search space configuration |
| Fifth step | PDCCH and PDSCH | * Cell access information<br>* RACH configuration |

There are 336 cell ID groups, and there are 3 cell IDs for each cell ID group. There are a total of 1008 cell IDs, and a cell ID can be defined by Equation 3.

$N_{ID}^{cell}=3N_{ID}^{(1)}+N_{ID}^{(2)}$ where $N_{ID}^{(1)} \in \{0,1,\ldots,335\}$ and $N_{ID}^{(2)} \in \{0,1,2\}$  [Equation 3]

Here, $N_{ID}^{cell}$ represents a cell ID (e.g., PCID). $N_{ID}^{(1)}$ represents a cell ID group and is provided/obtained through an SSS. $N_{ID}^{(2)}$ represents a cell ID in a cell ID group and is provided/obtained through a PSS.

A PSS sequence $d_{PSS}(n)$ may be defined to satisfy Equation 4.

$d_{PSS}(n)=1-2x(m)$ $m=(n+43N_{ID}^{(2)}) \bmod 127$ $0 \le n < 127$  [Equation 4]

where $x(i+7)=(x(i+4)+x(i)) \bmod 2$ and
$[x(6)\ x(5)\ x(4)\ x(3)\ x(2)\ x(1)\ x(0)]=[1\ 1\ 1\ 0\ 1\ 1\ 0]$ An SSS sequence $d_{SSS}(n)$ may be defined to satisfy Equation 5.

$d_{SSS}(n) =$  [Equation 5]

$[1-2x_0((n+m_0) \bmod 127)][1-2x_1((n+m_1) \bmod 127)]$

Figure 8:
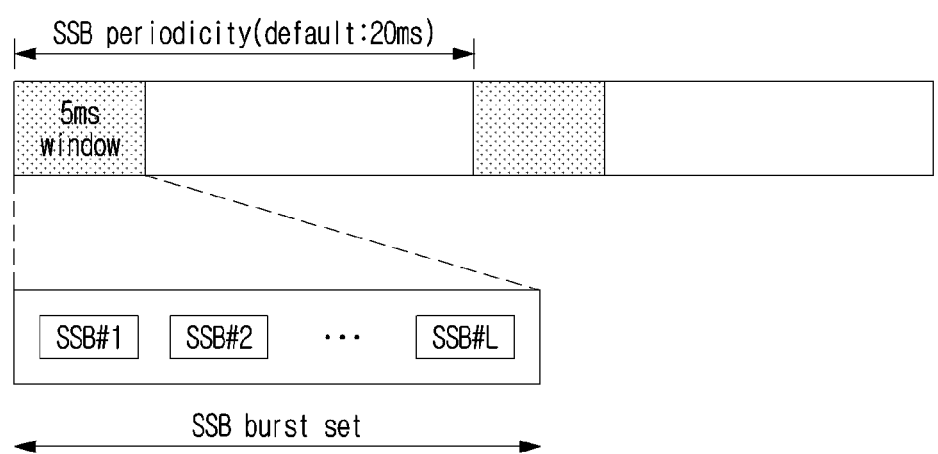
FIG. 8 illustrates SSB transmission in a wireless communication system to which the present disclosure may be applied.

-continued $m_0 = 15 \left\lfloor \frac{N_{ID}^{(1)}}{112} \right\rfloor + 5N_{ID}^{(2)}$ $m_1 = N_{ID}^{(1)} \bmod 112$ $0 \le n < 127$ Where $x_0(i+7) = (x_0(i+4)+x_0(i)) \bmod 2$ and
$x_1(i+7) = (x_1(i+1)+x_1(i)) \bmod 2$ $[x_0(6)\ x_0(5)\ x_0(4)\ x_0(3)\ x_0(2)\ x_0(1)\ x_0(0)] = [0\ 0\ 0\ 0\ 0\ 0\ 1]$ $[x_1(6)\ x_1(5)\ x_1(4)\ x_1(3)\ x_1(2)\ x_1(1)\ x_1(0)] = [0\ 0\ 0\ 0\ 0\ 0\ 1]$ FIG. 8 illustrates SSB transmission in a wireless communication system to which the present disclosure may be applied.

An SSB is transmitted periodically according to SSB periodicity. An SSB basic period assumed by a UE during initial cell search is defined as 20 ms. After cell access, an SSB period may be configured with one of {5 ms, 10 ms, 20 ms, 40 ms, 80 ms, 160 ms} by a network (e.g., base station). At a beginning of an SSB period, a SSB burst set is configured. An SSB burst set is composed of a 5 ms time window (i.e., half-frame), and an SSB can be transmitted up to L times within an SS burst set. A maximum transmission number L of an SSB may be given as follows according to a frequency band of a carrier. One slot includes up to two SSBs.

for a frequency range up to 3 GHz, L=4
for a frequency range from 3 GHz to 6 GHz, L=8
for a frequency range from 6 GHz to 52.6 GHz, L=64

A time position of an SSB candidate within an SS burst set may be defined as follows according to SCS. Time locations of an SSB candidate are indexed from 0 to L−1 (SSB index) according to a time order within an SSB burst set (i.e., half-frame).

Case A—15 kHz SCS: An index of a start symbol of a candidate SSB is given by {2, 8}+14*n. When a carrier frequency is 3 GHz or less, n=0, 1. When a carrier frequency is 3 GHz to 6 GHz, n=0, 1, 2, 3.

Case B—30 kHz SCS: An index of a start symbol of a candidate SSB is given by {4, 8, 16, 20}+28*n. n=0 when a carrier frequency is 3 GHz or less. When a carrier frequency is 3 GHz to 6 GHz, n=0, 1.

Case C—30 kHz SCS: An index of a start symbol of a candidate SSB is given by {2, 8}+14*n. When a carrier frequency is 3 GHz or less, n=0, 1. When a carrier frequency is 3 GHz to 6 GHz, n=0, 1, 2, 3.

Case D—120 kHz SCS: An index of a start symbol of a candidate SSB is given by {4, 8, 16, 20}+28*n. When a carrier frequency is greater than 6 GHz, n=0, 1, 2, 3, 5, 6, 7, 8, 10, 11, 12, 13, 15, 16, 17, 18.

Case E—240 kHz SCS: An index of a start symbol of a candidate SSB is given by {8, 12, 16, 20, 32, 36, 40, 44}+56*n. When a carrier frequency is greater than 6 GHz, n=0, 1, 2, 3, 5, 6, 7, 8.

Figure 9:
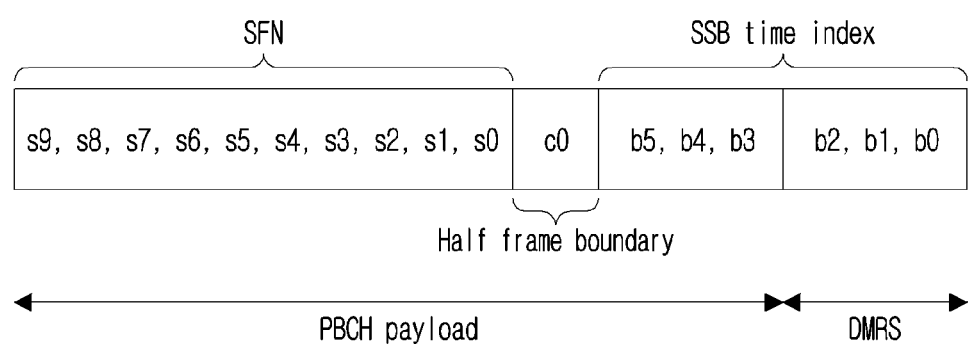
FIG. 9 illustrates obtaining information on downlink time synchronization by a terminal in a wireless communication system to which the present disclosure may be applied.

FIG. 9 illustrates obtaining information on downlink time synchronization by a terminal in a wireless communication system to which the present disclosure may be applied.

A UE may acquire DL synchronization by detecting an SSB. A UE can identify a structure of an SSB burst set based on the detected SSB index, and can detect a symbol/slot/half-frame boundary accordingly. A frame/half-frame number to which the detected SSB belongs can be identified using SFN information and half-frame indication information.

Specifically, a UE may obtain 10-bit System Frame Number (SFN) information from a PBCH (s0 to s9). Of the 10-bit SFN information, 6 bits are obtained from an MIB (Master Information Block), and a remaining 4 bits are obtained from a PBCH TB (Transport Block).

Next, a UE may obtain 1-bit half-frame indication information (c0). When a carrier frequency is 3 GHz or less, half-frame indication information may be implicitly signaled using a PBCH DMRS. A PBCH DMRS indicates 3-bit information by using one of 8 PBCH DMRS sequences. Therefore, in the case of L=4, among 3 bits that can be indicated using 8 PBCH DMRS sequences, 1 bit remaining after indicating an SSB index can be used for half-frame indication.

Finally, a UE may acquire an SSB index based on a DMRS sequence and a PBCH payload. SSB candidates are indexed from 0 to L−1 according to time order within an SSB burst set (i.e., half-frame). When L=8 or 64, least significant bit (LSB) 3 bits of an SSB index, can be indicated using 8 different PBCH DMRS sequences (b0 to b2). When L=64, most significant bit (MIB) 3 bits of an SSB index are indicated through a PBCH (b3 to b5). When L=2, LSB 2 bits of an SSB index, can be indicated using 4 different PBCH DMRS sequences (b0, b1). When L=4, among 3 bits that can be indicated using 8 PBCH DMRS sequences, 1 bit remaining after indicating an SSB index can be used for half-frame indication (b2).

Hereinafter, acquisition of system information will be described.

Figure 10:
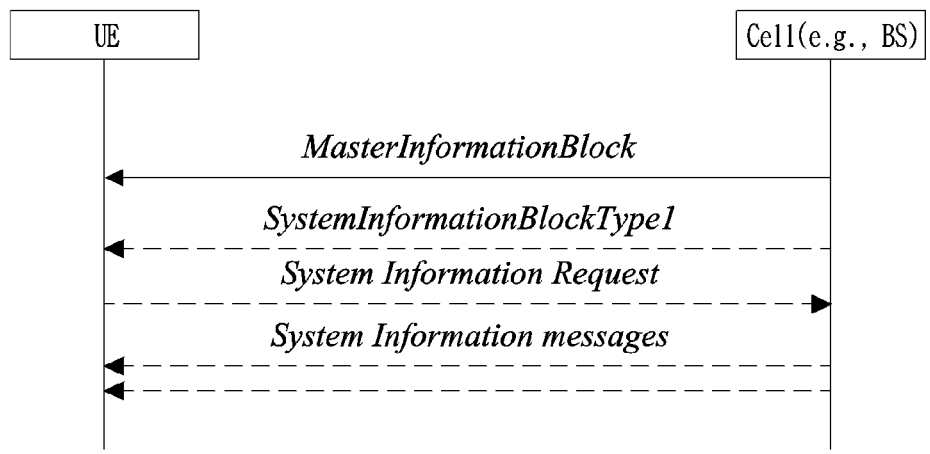
FIG. 10 illustrates a system information acquisition process.

FIG. 10 illustrates a system information acquisition process.

A UE may obtain access stratum (AS)/non-access stratum (NAS) information through a system information (SI) acquisition process. A SI acquisition process may be applied to a UE in an RRC idle (RRC_IDLE) state, an RRC inactive (RRC_INACTIVE) state, and an RRC connected (RRC_CONNECTED) state.

SI is divided into a master information block (MIB) and a plurality of system information blocks (SIB). SI other than an MIB may be referred to as Remaining Minimum System Information (RMSI) and Other System Information (OSI). RMSI corresponds to SIB1, and OSI refers to SIBs other than SIB2 and higher than SIB2. For details, the following may be referenced.

An MIB includes information/parameters related to SIB1 (SystemInformationBlockType1) reception and is transmitted through a PBCH of an SSB (SS/PBCH block). MIB information may include fields shown in Table 7.

Table 7 illustrates a part of an MIB.

TABLE 7

| | |
|---|---|
| subCarrierSpacingCommon | ENUMERATED {scs15or60, scs30or120}, |
| ssb-SubcarrierOffset | INTEGER (0..15), |
| pdcch-ConfigSIB1 | INTEGER (0..255), |

Table 8 illustrates a description of MIB fields illustrated in Table 7.

TABLE 8 pdcch-ConfigSIB1
The field pdcch-ConfigSIB1 determines a common
ControlResourceSet (CORESET), a common search space and
necessary PDCCH parameters.
If the field ssb-
SubcarrierOffset indicates that SIB1 is absent, the field pdc
ch- TABLE 8-continued ConfigSIB1 indicates the frequency positions where the UE may
find SS/PBCH block with SIB1 or the frequency range where the
network does not provide SS/PBCH block with SIB1
ssb-SubcarrierOffset.
The field ssb-SubcarrierOffset corresponds to k SSB, which is
the frequency domain offset (number of subcarriers) between
SSB and the overall resource block grid.
The value range of the field ssb-SubcarrierOffset may be
extended by an additional most significant bit encoded within
PBCH.
The field ssb-SubcarrierOffset may indicate that this cell does
not provide SIB1 and that there is hence no CORESET#0
configured in MIB. In this case, the field pdcch-ConfigSIB1
may indicate the frequency positions where the UE may (not)
find a SS/PBCH with a control resource set and search space
for SIB1.
subCarrierSpacingCommon
The field subCarrierSpacingCommon indicates subcarrier spacing
for SIB1, Msg.2/4 and MsgB for initial access, paging and
broadcast SI-messages. If the UE acquires this MIB on an FR1
carrier frequency, the value scs15or60 corresponds to 15 kHz
and the value scs30or120 corresponds to 30 kHz. If the UE
acquires this MIB on an FR2 carrier frequency, the value
scs15or60 corresponds to 60 kHz and the value scs30or120
corresponds to 120 kHz.

Upon initial cell selection, a UE assumes that half-frames with an SSB are repeated in a period of 20 ms. A UE may check whether a Control Resource Set (CORESET) exists for the Type0-PDCCH common search space based on an MIB. The Type0-PDCCH common search space is a type of PDCCH search space and is used to transmit a PDCCH for scheduling an SI message. When the Type0-PDCCH common search space exists, a UE may determine (i) a plurality of contiguous RBs and one or more contiguous symbols constituting a CORESET and (ii) a PDCCH occasion (i.e., time domain location for PDCCH reception) based on information in an MIB (e.g., pdcch-ConfigSIB1). Specifically, pdcch-ConfigSIB1 is 8-bit information, (i) is determined based on 4 bits of MSB (Most Significant Bit) (refer to 3GPP TS 38.213 Table 13-1~13-10), and (ii) is determined based on 4 bits of LSB (Least Significant Bit) (refer to 3GPP TS 38.213 Table 13-11~13-15).

As an example, information indicated by MSB 4 bits of pdcch-ConfigSIB1 is exemplified as follows.

A configuration of a CORESET for the Type0-PDCCH common search space is:
  i) Define multiple tables according to subcarrier spacing and channel minimum bandwidth.
  ii) Indicates a multiplexing pattern between an SS/PBCH block and a PDCCH/PDSCH.
    Pattern 1: All SCS combinations for FR1, all SCS combinations for FR2
    Pattern 2: Different SCS combinations for FR2 (except for the combination of 60 kHz for an initial DL BWP and 240 kHz SCS for a SS/PBCH block)
    Pattern 3: Same SCS combination for FR2 (for 120 kHz SCS)
  iii) indicates the number of PRBs and OFDM symbols for a CORESET.
    $N_{RB}^{CORESET}$: number of RBs (i.e. {24, 48, 96})
    $N_{Symb}^{CORESET}$: number of symbols (i.e. {1, 2, 3})
  iv) Indicates an offset (the number of RBs) between the first RB of an SS/PBCH block and the first RB of an RMSI CORESET.
    A range of an offset (number of RBs) is determined by the number of PRBs and sync raster0.
    Design to align a center of an SS/PBCH block and a center of an RMSI CORESET as close as possible.

When the Type0-PDCCH common search space does not exist, pdcch-ConfigSIB1 provides information on a frequency location where an SSB/SIB1 exists and a frequency range where an SSB/SIB1 does not exist.

In the case of initial cell selection, a UE may assume that a half frame with an SS/PBCH block occurs with a period of 2 frames. Upon detection of an SS/PBCH block, if $k_{SSB} \leq 23$ for FR1 (Sub-6 GHz; 450 to 6000 MHz) and $k_{SSB} \leq 11$ for FR2 (mm-Wave, 24250 to 52600 MHz), a UE determines that a control resource set for the Type0-PDCCH common search space exists. If $k_{SSB} > 23$ for FR1 and $k_{SSB} > 11$ for FR2, a UE determines that a control resource set for the Type0-PDCCH common search space does not exist. $k_{SSB}$ represents a frequency/subcarrier offset between subcarrier 0 of an SS/PBCH block and subcarrier 0 of a common resource block for an SSB. For FR2, only a maximum of 11 values can be applied. $k_{SSB}$ can be signaled through an MIB. An SIB1 includes information related to availability and scheduling (e.g., transmission period, SI-window size) of the remaining SIBs (hereinafter, SIBx, where x is an integer greater than or equal to 2). For example, an SIB1 may inform whether SIBx is periodically broadcast or provided at a request of a UE by an on-demand scheme. When SIBx is provided by an on-demand method, an SIB1 may include information necessary for a UE to perform an SI request. An SIB1 is transmitted through a PDSCH, a PDCCH scheduling the SIB1 is transmitted through the Type0-PDCCH common search space, and the SIB1 is transmitted through a PDSCH indicated by a PDCCH.

SIBx is included in an SI message and transmitted through a PDSCH. Each SI message is transmitted within a periodically occurring time window (i.e., SI-window).

PDCCH Transmission and Reception Method

- PUSCH: Physical Uplink Shared Channel
- RRM: Radio resource management
- SCS: Sub-carrier spacing
- RLM: Radio link monitoring
- DCI: Downlink Control Information
- CAP: Channel Access Procedure
- Ucell: Unlicensed cell
- TBS: Transport Block Size
- TDRA: Time Domain Resource Allocation
- SLIV: Starting and Length Indicator Value (This is an indication value for a start symbol index and number of symbols in a slot of a PDSCH and/or PUSCH. It may be configured as a component of an entry constituting a TDRA field in a PDCCH that schedules a corresponding PDSCH and/or PUSCH.)
- BWP: BandWidth Part (It may be composed of consecutive resource blocks (RBs) on a frequency axis. It may correspond to one numerology (e.g., SCS, CP length, slot/mini-slot duration, etc.). In addition, multiple BWPs may be configured in one carrier (the number of BWPs per carrier may also be limited), however the number of activated BWPs may be limited to a part (e.g., one) per carrier.)
- CORESET: control resource set (CONtrol REsourse SET) (It means a time-frequency resource region in which a PDCCH can be transmitted, and the number of CORESETs per BWP may be limited.)
- REG: Resource element group
- SFI: Slot Format Indicator (It is an indicator indicating a symbol-level DL/UL direction within a specific slot (s) and transmitted through a group common PDCCH).
- COT: Channel occupancy time
- SPS: Semi-persistent scheduling
- PLMN ID: Public Land Mobile Network identifier As more and more communication devices require a greater communication capacity, efficient use of a limited frequency band in a next-generation wireless communication system becomes an increasingly important requirement. A cellular communication system such as the LTE/NR system is also considering a method of utilizing an unlicensed band such as the 2.4 GHz band mainly used by existing WiFi systems or the newly emerging 5 GHz and 60 GHz bands for traffic offloading. Basically, since an unlicensed band assumes a method of wireless transmission and reception through competition between each communication node, it is required that each communication node perform channel sensing before transmitting a signal to confirm that another communication node is not transmitting a signal. For convenience, this operation is referred to as listen before talk (LBT) or a channel access procedure (CAP). Specifically, an operation of checking whether another communication node is transmitting a signal is defined as carrier sensing (CS), and a case in which it is determined that another communication node does not transmit a signal is defined as a confirmed clear channel assessment (CCA). In the following description, LBT may be replaced with a CAP. An eNB/gNB or UE of the LTE/NR system should also perform LBT for signal transmission in an unlicensed band (referred to as U-band for convenience). Similarly, when an eNB/gNB or UE of the LTE/NR system transmits a signal, other communication nodes such as Wi-Fi (or WiGig (Wireless Gigabit Alliance) such as 802.11ad/ay) should also perform LBT to avoid interference. For example, in the Wi-Fi standard (802.11ac), a CCA threshold is specified as −62 dBm for non Wi-Fi signals and −82 dBm for Wi-Fi signals. This means that a STA or AP does not transmit a signal so as not to cause interference when, for example, a signal other than Wi-Fi is received with a power of −62 dBm or more.

The 3GPP Rel-15 (release-15) NR system defines an operation of a band below 52.6 GHz. In a future release, discussions are underway to operate the NR system in licensed and/or unlicensed bands in the 60/70 GHz band (specifically, a frequency band of 52.6 GHz or higher, or a frequency band of 52.6 GHz or higher and 71 GHz or lower). In the present disclosure, the corresponding band is referred to as frequency range 2-2 (FR 2-2) for convenience, and an initial access method including SS/PBCH block transmission and reception and SIB1 PDCCH/PDSCH transmission and reception on the FR 2-2 frequency band is proposed.

In the Rel-15 NR system, the mmWave band (e.g., above 7.125 or 24.25 GHz, up to 52.6 GHz) is defined as FR2 (frequency range 2), and in the corresponding band, sub-carrier spacing (SCS) of an SS/PBCH block may be 120 or 240 kHz.

Figure 11:
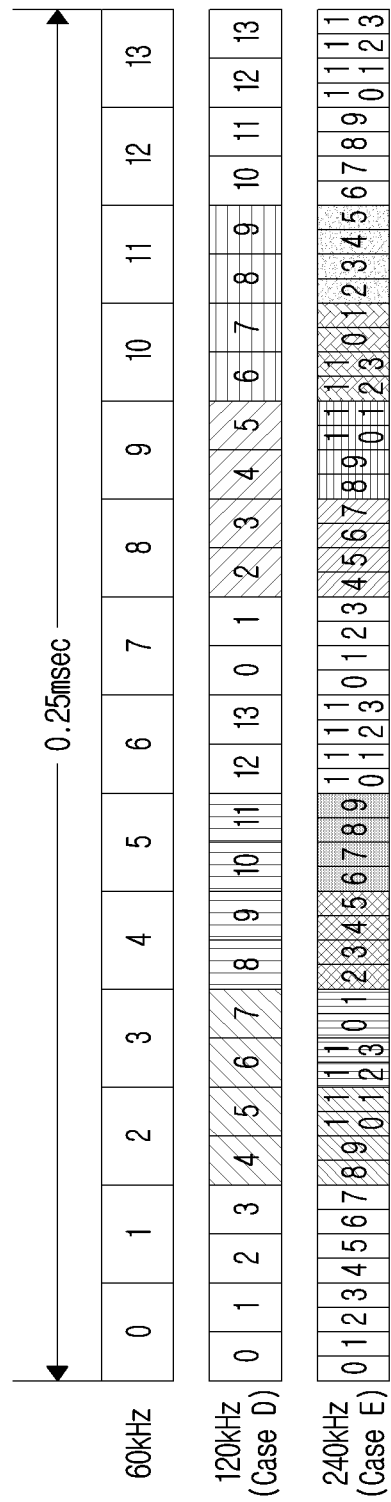
FIG. 11 illustrates transmission of an SS/PBCH block in a wireless communication system to which the present disclosure may be applied.

FIG. 11 illustrates transmission of an SS/PBCH block in a wireless communication system to which the present disclosure may be applied.

In FIG. 11, SS/PBCH block transmission for each SCS in FR2 is illustrated at a symbol level on a time axis (time domain).

Specifically, as shown in FIG. 11, up to 4 or 8 SS/PBCH blocks may be transmitted within 0.25 msec (e.g., 2 slots based on 120 kHz SCS, 4 slots based on 240 kHz SCS).

Referring to FIG. 11, for example, based on 120 kHz SCS, SS/PBCH block (candidate) index n may be transmitted in symbol 4/5/6/7 of the first slot, and SS/PBCH block (candidate) index n+1 may be transmitted in symbol 8/9/10/11 of the first slot. In addition, SS/PBCH block (candidate) index n+2 may be transmitted in symbol 2/3/4/5 of the second slot, and SS/PBCH block (candidate) index n+2 may be transmitted in symbol 6/7/8/9 of the second slot.

Also, for example, based on 240 kHz SCS, SS/PBCH block (candidate) index n may be transmitted in symbol 8/9/10/11 of the first slot, SS/PBCH block (candidate) index n+1 may be transmitted in symbol 12/13 of the first slot and symbol 0/1 of the second slot, SS/PBCH block (candidate) index n+2 may be transmitted in symbol 2/3/4/5 of the second slot, and SS/PBCH block (candidate) index n+3 may be transmitted in symbol 6/7/8/9 of the second slot. And, SS/PBCH block (candidate) index n+4 may be transmitted in symbol 4/5/6/7 of the third slot, SS/PBCH block (candidate) index n+5 may be transmitted in symbol 8/9/10/11 of the third slot, SS/PBCH block (candidate) index n+6 may be transmitted in symbol 12/13 of the third slot and symbol 0/1 of the fourth slot, and SS/PBCH block (candidate) index n+7 may be transmitted in symbol 2/3/4/5 of the fourth slot.

Figure 12:
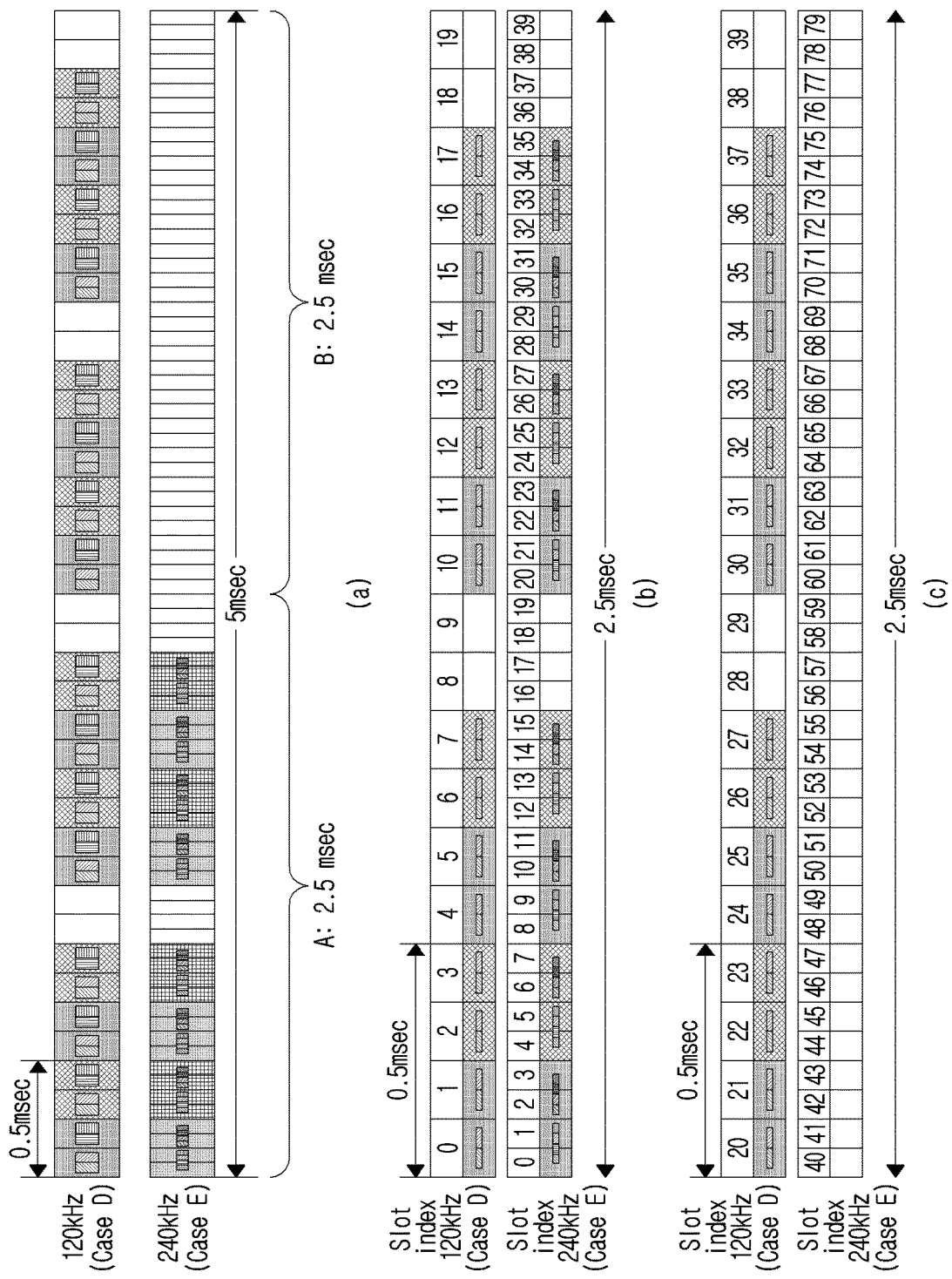
FIG. 12 illustrates transmission of an SS/PBCH block in a wireless communication system to which the present disclosure may be applied.

FIG. 12 illustrates transmission of an SS/PBCH block in a wireless communication system to which the present disclosure may be applied.

FIG. 11 shows SS/PBCH block transmission for each SCS at a symbol level on a time axis (time domain), and FIG. 12 shows SS/PBCH block transmission for each SCS at a slot level on a time axis.

FIG. 12(*b*) is an enlarged view of part A (first 2.5 msec) in FIG. 12(*a*), and FIG. 12(*b*) is an enlarged view of part B (second 2.5 msec) in FIG. 12(*a*).

In the present disclosure, for convenience of description, it is assumed that a window in which an SS/PBCH block can be transmitted is a 5 msec window (see FIG. 12(*a*)) (this is referred to as S_window for convenience), a duration of the window may be configured by a base station to a different value (e.g., 0.5 msec, 1/2/3/4 msec, etc.).

Referring to FIG. 12(*a*), there are a total of 40 slots (e.g., slots 0 to 39) based on 120 kHz SCS within a 5 msec window, and SS/PBCH blocks can be transmitted during 8 consecutive slots. There is a 2-slot gap (e.g., slots 8 to 9) between corresponding consecutive 8 slots (e.g., slots 0 to 7 and 10 to 17). Here, up to 4 SS/PBCH blocks can be transmitted as shown in 120 kHz of FIG. 11 during 2 slots (e.g., slots 0~1/2~3/4~5/6~7) among 8 consecutive slots (e.g., slots 0-7) in which SS/PBCH blocks can be transmitted.

Similarly, there are a total of 80 slots (e.g., slots 0 to 79) based on 240 kHz SCS within a 5 msec window, and SS/PBCH blocks can be transmitted during 16 consecutive slots. There is a 4-slot gap (e.g., slots 16 to 19) between corresponding 16 consecutive slots (e.g., slots 0 to 15/20 to 35). Here, up to 8 SS/PBCH blocks can be transmitted as shown in 240 kHz of FIG. 11 during 4 slots (e.g., slots 0~3/4~7/8~11/12~15) among 16 consecutive slots (e.g., slots 0-15) in which SS/PBCH blocks can be transmitted.

That is, a maximum number of SS/PBCH block (candidate) indices allowed in 120 kHz and 240 kHz SCS may be limited to 64, and SS/PBCH blocks corresponding to which indexes among up to 64 are actually transmitted can be configured by cell-specific or UE-specific RRC signaling.

Even if the NR system is extended to be operable in FR 2-2, for SCS for an SS/PBCH block, 120 kHz SCS may be applied similarly to that defined in the existing Rel-15 NR FR2. In addition, in consideration of broadband operation reaching a 2 GHz bandwidth (approximately 2.16 GHz), SCS for an SS/PBCH block can additionally consider 480 kHz and 960 kHz. Here, the present disclosure proposes a method for configuring a transmission pattern of a corresponding SS/PBCH block, configuring a PDCCH monitoring location for scheduling system information (data) (i.e., configuring a monitoring occasion of CORESET #0 through a type0-PDCCH common search space (CSS) set), and a method for scheduling system information data, etc.

Meanwhile, a method for obtaining a serving cell timing by a UE or a method for obtaining a quasi-co-location (QCL) relationship between SS/PBCH blocks by a UE or a method of notifying a UE of actually transmitted SS/PBCH block (candidate) indices among up to 64 SS/PBCH blocks may also be described. In the present disclosure, the fact that two SS/PBCH blocks are in a QCL relationship may mean that a UE can assume that the two SS/PBCH blocks have the same (large-scale) channel properties (e.g., average gain, Doppler shift, Doppler spread, average delay, delay spread, spatial Rx parameter (i.e., reception beam), etc.).

Embodiment 1: When {SS/PBCH block SCS, CORESET index 0 SCS}={120, 120} kHz, a time axis resource configuration of CORESET index 0 corresponding to each SS/PBCH block and a default PDSCH time domain resource allocation (TDRA) value are proposed.

Figure 13:
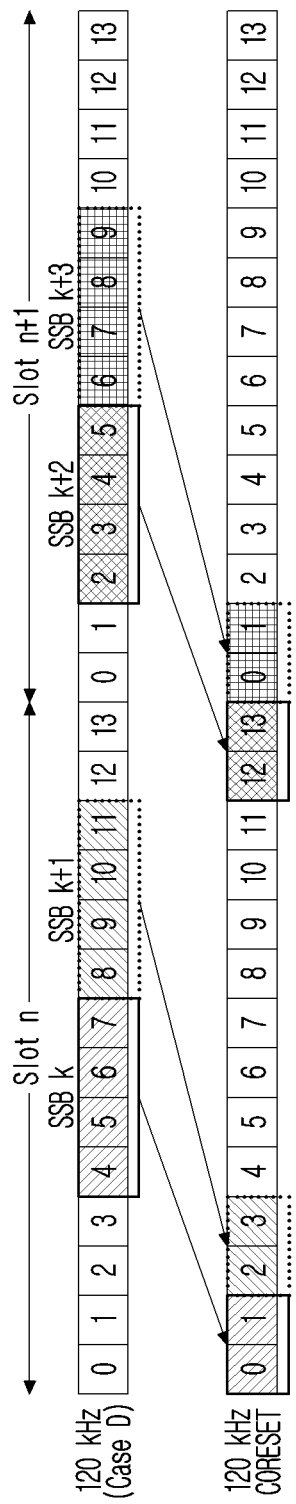
FIG. 13 is a diagram illustrating a configuration of CORE-SET index 0 according to an embodiment of the present disclosure.

FIG. 13 is a diagram illustrating a configuration of CORESET index 0 according to an embodiment of the present disclosure.

It may be configured by a PBCH for CORESET index 0 and type0-PDCCH search space (SS) set as shown in FIG. 13. A slot index n value may be all or part of n values (e.g., n=0, 2, 4, 6, . . . ) resulting in a 0 value by performing a modulo 2 operation.

CORESET index 0 corresponding to SS/PBCH block k (symbols 4/5/6/7 on slot n in FIG. 13) may be configured to symbol 0/1 on slot n. CORESET index 0 corresponding to SS/PBCH block k+1 (symbols 8/9/10/11 on slot n in FIG. 13) may be configured to symbols 2/3 on slot n. Additionally, a 1-symbol CORESET may be configured instead of a 2-symbol CORESET. For example, 1-symbol CORESET index 0 corresponding to SS/PBCH block k may be configured to symbol 0 or 1 on slot n. In addition, 1-symbol CORESET index 0 corresponding to SS/PBCH block k+1 may be configured to symbol 1 or 2 on slot n.

CORESET index 0 corresponding to SS/PBCH block k+2 (symbols 2/3/4/5 on slot n+1 in FIG. 13) may be configured to symbols 12/13 on slot n. CORESET index 0 corresponding to SS/PBCH block k+3 (symbol 6/7/8/9 on slot n+1 in FIG. 13) may be configured to symbol 0/1 on slot n+1. Additionally, a 1-symbol CORESET can be configured instead of a 2-symbol CORESET. For example, 1-symbol CORESET index 0 corresponding to SS/PBCH block k+2 may be configured to symbol 12 or 13 on slot n. In addition, 1-symbol CORESET index 0 corresponding to SS/PBCH block k+3 may be configured to symbol 13 on slot n or symbol 0 on slot n+1.

The above method can be applied when a multiplexing pattern between an SS/PBCH block (SSB) and a CORESET is a TDM pattern (i.e., SS/PBCH block and CORESET multiplexing pattern 1) and/or an FDM pattern (i.e., SS/PBCH block and CORESET multiplexing pattern 3). Through this (even in the case of a TDM pattern), by transmitting an SS/PBCH block and corresponding CORESET index 0 in the same (continuous) burst (e.g., by continuously transmitting an SS/PBCH block and corresponding CORESET index 0), especially when a channel must be occupied for a predetermined time after completion of a CAP, such as in an unlicensed band, can be beneficial.

As shown in Tables 9 and 10 below, excerpted from the 3GPP TS 38.214 document, before receiving UE-specific RRC signaling, a UE checks time axis resource allocation using a default table. For example, referring to Table 9, if an RNTI of a PDCCH is a SI-RNTI for receiving SIB1 or RMSI, etc., and in case of the SS/PBCH block and CORESET multiplexing pattern 1 (i.e., TDM between an SS/PBCH block and CORESET index 0), time domain resource allocation (TDRA) for a corresponding PDSCH follows the default A parameter set, which is shown in Table 10 (hereafter, referred to as default TDRA table).

The TDRA method proposed in this embodiment can be applied only to a PDSCH scheduled through CORESET index 0 before receiving RRC signaling related to a SLIV. More specifically, it may be applied only to a PDSCH carrying system information (or paging message or random access response message) (before receiving RRC signaling related to a SLIV).

Table 9 illustrates the applicable PDSCH time domain resource allocation specified in 3GPP TS 38.214.

TABLE 9

| RNTI | PDCCH search space | SS/PBCH block and CORESET multi-plexing pattern | pdsch-Config-Common includes pdsch-TimeDomainAl-location-List | pdsch-Config includes pdsch-TimeDomainAl-location-List | PDSCH time domain resource allocation to apply |
|---|---|---|---|---|---|
| SI-RNTI | Type0 common | 1 | — | — | Default A for normal CP |
|  |  | 2 | — | — | Default B |
|  |  | 3 | — | — | Default C |
| SI-RNTI | Type0A common | 1 | No | — | Default A |
|  |  | 2 | No | — | Default B |
|  |  | 3 | No | — | Default C |
|  |  | 1, 2, 3 | Yes | — | pdsch-TimeDomainAl-location List provided in pdsch-Config-Common |
| RA-RNTI, TC-RNTI | Type1 common | 1, 2, 3 | No | — | Default A |
|  |  | 1, 2, 3 | Yes | — | pdsch-TimeDomainAl-location List provided in pdsch-Config-Common |
| P-RNTI | Type2 common | 1 | No | — | Default A |
|  |  | 2 | No | — | Default B |
|  |  | 3 | No | — | Default C |
|  |  | 1, 2, 3 | Yes | — | pdsch-TimeDomainAl-location List provided in pdsch-Config-Common |

TABLE 9-continued

| RNTI | PDCCH search space | SS/PBCH block and CORESET multi-plexing pattern | pdsch-Config-Common includes pdsch-TimeDomainAl-location-List | pdsch-Config includes pdsch-TimeDomainAl-location-List | PDSCH time domain resource allocation to apply |
|---|---|---|---|---|---|
| C-RNTI, MCS-C-RNTI, CS-RNTI | Any common search space associated with CORESET 0 | 1, 2, 3 | No | — | Default A |
|  |  | 1, 2, 3 | Yes | — | pdsch-TimeDomainAl-location List provided in pdsch-Config-Common |
| C-RNTI, MCS-C-RNTI, CS-RNTI | Any common search space not associated with CORESET 0 UE specific search space | 1, 2, 3 | No | No | Default A |
|  |  | 1, 2, 3 | Yes | No | pdsch-TimeDomainAl-location List provided in pdsch-Config-Common |
|  |  | 1, 2, 3 | No/Yes | Yes | pdsch-TimeDomainAl-cloation List provided in pdsch-Config |

Table 10 illustrates the default PDSCH time domain resource allocation A for a normal CP specified in 3GPP TS 38.214.

TABLE 10

| Row index | dmrs-TypeA-Position | PDSCH mapping type | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |

TABLE 10-continued

| Row index | dmrs-TypeA-Position | PDSCH mapping type | $K_0$ | S | L |
|---|---|---|---|---|---|
| 16 | 2, 3 | Type B | 0 | 8 | 4 |

In the default TDRA Table (i.e., Table 10), the RRC parameter dmrs-TypeA-position may be signaled through a PBCH. If dmrs-TypeA-position=2, it means that the first DM-RS symbol of PDSCH mapping type A is the third symbol in a slot, and if dmrs-TypeA-position=3, it may mean that the first DM-RS symbol of PDSCH mapping type A is the fourth symbol in a slot. In PDSCH mapping Type B, the first symbol of a PDSCH is basically a DM-RS symbol. If $K_0$ is 0, it means that a PDSCH and a PDCCH scheduling the corresponding PDSCH are located in the same slot. S and L respectively mean a starting symbol index of a PDSCH and a number of consecutive symbols in a slot.

When transmitting an SS/PBCH block and the corresponding CORESET index 0 as shown in FIG. 13, it may be more advantageous (especially considering the case where a channel must be occupied for a predetermined time after completion of a CAP, such as in an unlicensed band) that a PDSCH scheduled by a PDCCH in a CORESET is also scheduled to belong to the same (continuous) burst (e.g., when an SS/PBCH block and corresponding CORESET index 0 are transmitted, a PDSCH scheduled by a PDCCH in a CORESET is also continuously transmitted). To support this, all or some of $\{K_0, S, L\}$ values may be signaled on the default TDRA table (i.e., FIG. 10) as follows (e.g., through RRC signaling). For example, when operating in a licensed band, the default TDRA table (i.e., FIG. 10) may be used as it is.

On the other hand, when operating in an unlicensed band, when transmitting an SS/PBCH block and corresponding CORESET index 0 in the default TDRA table (i.e., FIG. 10), $\{K_0, S, L\}$ of a row index corresponding to a PDSCH TDRA that does not belong to the same (continuous) burst may be substituted or may be interpreted as being substituted with the following $\{K_0, S, L\}$.

Alternatively, if it is not in the FR 2-2 band, the default TDRA table (i.e., FIG. 10) may be used as it is. On the other hand, in the case of the FR 2-2 band, some row indexes of the existing default TDRA table (i.e., FIG. 10) may be substituted or may be interpreted as being substituted with the following $\{K_0, S, L\}$.

- $\{0, 4, 4\}$ (e.g., for SSB k): For example, in index 7 of Table 10, if dmrs-TypeA-Position values are both 2 and 3, it can be applied (substituted). And/or for other index values (e.g., 9 or 10), it can be applied (substituted).
- $\{0, 8, 4\}$ (e.g., for SSB k+1)
- $\{1, 2, 4\}$ (e.g., for SSB k+2): For example, in the case of index 14 of Table 10, S and L values are the same, but only the $K_0$ value is different, so $\{1, 2, 4\}$ values can be applied (substituted) for index 14.
- $\{0, 6, 4\}$ (e.g., for SSB k+3): For example, at index 7 of Table 10, when dmrs-TypeA-Position values are both 2 and 3, it can be applied (substituted). And/or for other index values (e.g., 9 or 10), it can be applied (substituted).

Meanwhile, if an RNTI of a PDCCH is a SI-RNTI for receiving SIB1 or RMSI, etc., and in case of the SS/PBCH block and CORESET multiplexing pattern 3 (i.e., FDM between an SS/PBCH block and CORESET index 0), time domain resource allocation (TDRA) for a corresponding PDSCH follows the default C parameter set, which is shown in Table 11 (hereinafter referred to as default TDRA table C).

The TDRA method proposed in this embodiment can be applied only to a PDSCH scheduled through CORESET index 0 before receiving RRC signaling related to a SLIV. More specifically, it may be applied only to a PDSCH carrying system information (or paging message or random access response message) (before receiving RRC signaling related to a SLIV).

Table 11 illustrates the applicable PDSCH time domain resource allocation C specified in 3GPP TS 38.214.

TABLE 11

| Row index | dmrs-TypeA-Position | PDSCH mapping type | K0 | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | | Reserved | | | |
| 7 | | Reserved | | | |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |
| 15 (Note 1) | 2, 3 | Type A | 0 | 0 | 6 |
| 16 (Note 1) | 2, 3 | Type A | 0 | 2 | 6 |

Note 1:
The UE may assume that this PDSCH resource allocation is not used, if the PDSCH was scheduled with SI-RNTI in PDCCH Type0 common search space In the default TDRA Table C (i.e., Table 11), the RRC parameter dmrs-TypeA-position may be signaled through a PBCH. If dmrs-TypeA-position=2, it means that the first DM-RS symbol of PDSCH mapping type A is the third symbol in a slot, and if dmrs-TypeA-position=3, it may mean that the first DM-RS symbol of PDSCH mapping type A is the fourth symbol in a slot. In PDSCH mapping Type B, the first symbol of a PDSCH is basically a DM-RS symbol. If $K_0$ is 0, it means that a PDSCH and a PDCCH scheduling the corresponding PDSCH are located in the same slot. S and L respectively mean a starting symbol index of a PDSCH and a number of consecutive symbols in a slot.

When transmitting an SS/PBCH block and the corresponding CORESET index 0 as shown in FIG. 13, it may be more advantageous (especially considering the case where a channel must be occupied for a predetermined time after completion of a CAP, such as in an unlicensed band) that a PDSCH scheduled by a PDCCH in a CORESET is also scheduled to belong to the same (continuous) burst (e.g., when an SS/PBCH block and corresponding CORESET index 0 are transmitted, a PDSCH scheduled by a PDCCH in a CORESET is also continuously transmitted). To support this, all or some of $\{K_0, S, L\}$ values may be signaled on the default TDRA table (i.e., Table 11) as follows (e.g., through RRC signaling). For example, when operating in a licensed band, the default TDRA table C (i.e., Table 11) may be used as it is.

On the other hand, when operating in an unlicensed band, when transmitting an SS/PBCH block and corresponding CORESET index 0 in the default TDRA table (i.e., Table 11), {$K_0$, S, L} of a row index corresponding to a PDSCH TDRA that does not belong to the same (continuous) burst may be substituted or may be interpreted as being substituted with the following {$K_0$, S, L}.

Alternatively, if it is not in the FR 2-2 band, the default TDRA table (i.e., Table 11) may be used as it is. On the other hand, in the case of the FR 2-2 band, some row indexes of the existing default TDRA table C (i.e., Table 11) may be substituted or may be interpreted as being substituted with the following {$K_0$, S, L}.

{0, 4, 4} (e.g., for SSB k)
{0, 8, 4} (e.g., for SSB k+1)
{1, 2, 4} (e.g., for SSB k+2): For example, in the case of index 8, S and L values are the same but only the $K_0$ value is different, so {1, 2, 4} values can be applied (substituted) for index 8. Alternatively, in the case of index 6 or 7, which is a reserved state, {1, 2, 4} values may be applied (substituted).
{0, 6, 4} (e.g., for SSB k+3)

The methods proposed in the above-described Embodiment 1 can also be applied when {SS/PBCH block SCS, CORESET index 0 SCS}={480, 480} kHz and/or {SS/PBCH block SCS, CORESET index 0 SCS}={960, 960}. That is, when an SS/PBCH block pattern as shown in FIG. 13 can also be applied to 480 and/or 960 kHz SCS, a method for configuring a time axis resource of CORESET index 0 and a default TDRA table as in the methods proposed in the above-described Embodiment 1 can be applied.

Embodiment 2: When {SS/PBCH block SCS, CORESET index 0 SCS}={480, 480} kHz or {SS/PBCH block SCS, CORESET index 0 SCS}={960, 960} kHz, especially when TDM is performed between an SS/PBCH block and CORESET index 0, a configuration for type0-PDCCH CSS set is proposed.

In the existing Rel-15 NR system, when TDM is performed between an SS/PBCH block and CORESET index 0 for FR2, a monitoring occasion of type0-PDCCH CSS set is determined as follows.

For operation without shared spectrum channel access, and for the SS/PBCH block and CORESET multiplexing pattern 1, a UE monitors a PDCCH in Type0-PDCCH CSS set over two consecutive slots starting from slot no. For an SS/PBCH block of index i, a UE determines an index of slot $n_0$ as $n_0 = (O \cdot 2^\mu + \text{floor}(i \cdot M)) \bmod N_{slot}^{frame,\mu}$. Here, if floor$((O \cdot 2^\mu + \text{floor}(i \cdot M))/N_{slot}^{frame,\mu}) \bmod 2=0$, $n_0$ is determined within a frame having a system fame number (SFN) $SFN_c$ that satisfies $SFN_c \bmod 2=0$. Alternatively, if floor$((O \cdot 2^\mu + \text{floor}(i \cdot M))/N_{slot}^{frame,\mu}) \bmod 2=1$, $n_0$ is determined within a frame having an SFN that satisfies $SFN_c \bmod 2=1$. M and O are given by Table 12 (for FR1) and Table 13 (for FR2) and are based on SCS $\mu \in \{0,1,2,3\}$ for PDCCH receptions in the CORESET. An index for the first symbol of the CORESET in slots $n_0$ and $n_{0+1}$ is the first symbol index provided by Table 12 (for FR1) and Table 13 (for FR2).

For operation with shared spectrum channel access, and for the SS/PBCH block and CORESET multiplexing pattern 1, regarding average gain, QCL 'typeA' and 'typeD' characteristics, a UE monitors a PDCCH in Type0-PDCCH CSS set over slots including an Type0-PDCCH monitoring occasions associated with the QCLed SS/PBCH blocks with an SS/PBCH block providing a CORESET for the Type0-PDCCH CSS set. For a candidate SS/PBCH block index $\bar{\iota}$ ($0 \leq \bar{\iota} \leq \bar{\iota}_{max}-1$), two consecutive slots starting from slot $n_0$ include associated Type0-PDCCH monitoring occasions. A UE determines an index of slot $n_0$ as $n_0 = (O \cdot 2^\mu + \text{floor}(\bar{\iota} \cdot M)) \bmod N_{slot}^{frame,\mu}$. Here, if floor$(((O \cdot 2^\mu + \text{floor}(\bar{\iota} \cdot M))/N_{slot}^{frame,\mu}) \bmod 2=0$, $n_0$ is determined within a frame having a system fame number (SFN) $SFN_c$ that satisfies $SFN_c \bmod 2=0$. Alternatively, if floor$((O \cdot 2^\mu + \text{floor}(\bar{\iota} \cdot M))/N_{slot}^{frame,\mu}) \bmod 2=1$, $n_0$ is determined within a frame having an SFN that satisfies $SFN_c \bmod 2=1$. M and O are given by Table 12 and are based on SCS $\mu \in \{0,1\}$ for PDCCH receptions in the CORESET. An index for the first symbol of the CORESET in slots $n_0$ and $n_{0+1}$ is the first symbol index provided by Table 12. When $N_{SSB}^{QCL}=1$, a UE does not expect to be configured with M=½ or M=2.

Table 12 illustrates parameters for PDCCH monitoring occasions for Type0-PDCCH CSS set in the SS/PBCH block and CORESET multiplexing pattern 1 and FR 1, specified in 3GPP TS 38.214, when {SS/PBCH block SCS, CORESET index 0 SCS}={X, X}kHz (X is any one of {15, 30, 60, 120}).

TABLE 12

| Index | O | Number of search space sets per slot | M | First symbol index |
|---|---|---|---|---|
| 0 | 0 | 1 | 1 | 0 |
| 1 | 0 | 2 | ½ | {0, when i is even}, {$N_{symb}^{CORESET}$, when i is odd} |
| 2 | 2 | 1 | 1 | 0 |
| 3 | 2 | 2 | ½ | {0, when i is even}, {$N_{symb}^{CORESET}$, when i is odd} |
| 4 | 5 | 1 | 1 | 0 |
| 5 | 5 | 2 | ½ | {0, when i is even}, {$N_{symb}^{CORESET}$, when i is odd } |
| 6 | 7 | 1 | 1 | 0 |
| 7 | 7 | 2 | ½ | {0, when i is even}, {$N_{symb}^{CORESET}$, when i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

Table 13 illustrates parameters for PDCCH monitoring occasions for Type0-PDCCH CSS set in the SS/PBCH block and CORESET multiplexing pattern 1 and FR 2, specified in 3GPP TS 38.214, when {SS/PBCH block SCS, CORESET index 0 SCS}={X, X}kHz (X is any one of {15, 30, 60, 120}).

TABLE 13

| Index | O | Number of search space sets per slot | M | First symbol index |
|---|---|---|---|---|
| 0 | 0 | 1 | 1 | 0 |
| 1 | 0 | 2 | ½ | {0, when i is even}, {7, when i is odd} |
| 2 | 2.5 | 1 | 1 | 0 |
| 3 | 2.5 | 2 | ½ | {0, when i is even}, {7, when i is odd} |
| 4 | 5 | 1 | 1 | 0 |
| 5 | 5 | 2 | ½ | {0, when i is even}, {7, when i is odd} |
| 6 | 0 | 1 | 2 | { 0, when i is even}, {$N_{symb}^{CORESET}$, when i is odd} |
| 7 | 2.5 | 1 | 2 | { 0, when i is even}, {$N_{symb}^{CORESET}$, when i is |

TABLE 13-continued

| Index | O | Number of search space sets per slot | M | First symbol index |
|---|---|---|---|---|
| 8 | 5 | 2 | ½ | { 0, when i is even}, {$N_{symb}^{CORESET}$, when i is odd} |
| 9 | 7.5 | 1 | 1 | 0 |
| 10 | 7.5 | 2 | ½ | { 0, when i is even}, {7, when i is odd} |
| 11 | 7.5 | 2 | ½ | { 0, when i is even}, {$N_{symb}^{CORESET}$, when i is odd} |
| 12 | 0 | 1 | 2 | 0 |
| 13 | 5 | 1 | 2 | 0 |
| 14 | Reserved | | | |
| 15 | Reserved | | | |

As described above, a time axis distance (i.e., in a time domain) between a slot index including SS/PBCH block index 0 and a slot index including a monitoring occasion of CORESET index 0 corresponding to SS/PBCH block index 0 may be approximately O msec. And a corresponding O value can be indicated by Table 13. The O value may mean a distance (interval, offset) in a time domain between slots (indexes) including PDCCH monitoring occasions. While a time required to transmit all 64 SS/PBCH block indices is approximately 5 msec in case of 120 kHz SCS, it may be approximately 1 msec in case of 480 kHz SCS. That is, as SCS increases, a time required to transmit all SS/PBCH block (candidate) indices may be shortened, so a small value of O may be required as SCS increases in consideration of this. That is, by allowing a smaller value of O to be configured, by reducing a relative distance between an SS/PBCH block and CORESET index 0, efficient initial access-related channel transmission and reception may be possible.

Specifically, when {SS/PBCH block SCS, CORESET index 0 SCS}={480, 480} kHz or {SS/PBCH block SCS, CORESET index 0 SCS}={960, 960} kHz, a common scaling factor K (e.g., K=½, ¼, or ⅕) may be applied to the O values of Table 13.

For example, if K=0.5, {SS/PBCH block SCS, CORESET index 0 SCS}={480, 480} kHz or {SS/PBCH block SCS, CORESET index 0 SCS}={960, 960} kHz, the O value for each index may be as shown in Table 14 below (or may be interpreted as shown in Table 14 below).

Here, Table 14 illustrates a case in which scaling factors are applied to all row indices for convenience of description, a scaling factor may be applied only to some row indexes (e.g., row indexes 2, 3, and 7 with an O value of 2.5), and the O values of the remaining row indices may be maintained the same as in Table 13 above.

Table 14 illustrates parameters for PDCCH monitoring occasions for the Type0-PDCCH CSS set (e.g., in the SS/PBCH block and CORESET multiplexing pattern 1 and FR 2-2) according to an embodiment of the present disclosure.

TABLE 14

| Index | O | Number of search space sets per slot | M | First symbol index |
|---|---|---|---|---|
| 0 | 0 | 1 | 1 | 0 |
| 1 | 0 | 2 | ½ | {0, when i is even}, {7, when i is odd} |
| 2 | 1.25 | 1 | 1 | 0 |
| 3 | 1.25 | 2 | ½ | {0, when i is even}, {7, when i is odd} |
| 4 | 2.5 | 1 | 1 | 0 |
| 5 | 2.5 | 2 | ½ | {0, when i is even}, {7, when i is odd} |
| 6 | 0 | 2 | ½ | {0, when i is even}, {$N_{symb}^{CORESET}$, when i is odd } |
| 7 | 1.25 | 2 | ½ | { 0, when i is even}, {$N_{symb}^{CORESET}$, when i is odd} |
| 8 | 2.5 | 2 | ½ | { 0, when i is even}, {$N_{symb}^{CORESET}$, when i is odd} |
| 9 | 3.75 | 1 | 1 | 0 |
| 10 | 3.75 | 2 | ½ | {0, when i is even}, { 7, when i is odd} |
| 11 | 3.75 | 2 | ½ | { 0, when i is even}, {$N_{symb}^{CORESET}$, when i is odd} |
| 12 | 0 | 1 | 2 | 0 |
| 13 | 2.5 | 1 | 2 | 0 |
| 14 | Reserved | | | |
| 15 | Reserved | | | |

Referring to Table 14, an O value can be determined based on information for determining a PDCCH monitoring occasion in an MIB (i.e., an index of Table 14) and {SS/PBCH block SCS, CORESET index 0 SCS}. As described above, for example, PDCCH configuration information (e.g., pdcch-ConfigSIB1) in an MIB includes information for determining a PDCCH monitoring occasion (information on the index) and information on a plurality of consecutive RBs and one or more consecutive symbols constituting a CORESET of the Type0-PDCCH CSS set.

As shown in Table 14, when {SS/PBCH block SCS, CORESET index 0 SCS}={480, 480} kHz and {SS/PBCH block SCS, CORESET index 0 SCS}={960, 960} kHz, all or some of candidate O values of Table 13 may be defined by applying a common scaling factor to candidate O values when {SCS of the SS/PBCH block, SCS of the PDCCH} are {X, X} kHz (X is any one of {15, 30, 60, 120}).

Meanwhile, when {SS/PBCH block SCS, CORESET index 0 SCS}={480, 480} kHz or {SS/PBCH block SCS, CORESET index 0 SCS}={960, 960} kHz, different scaling factor K values may be applied to the O values of Table 13 for each SCS.

For example, when {SS/PBCH block SCS, CORESET index 0 SCS}={480, 480} kHz, scaling factor K1 (e.g., K1=0.5, or K1=0.25) may be applied to all O values in Table 13. However, when {SS/PBCH block SCS, CORESET index 0 SCS}={960, 960} kHz, scaling factor K2 (e.g., K2=K½) may be applied to all O values in Table 13.

Alternatively, the scaling factor K (i.e., K1 for 480 kHz SCS, K2 for 960 kHz SCS) may be applied only to some row indices (e.g., row index 2, 3, 7 with the O value of 2.5), and the values of O may be maintained the same as in Table 13 above for some of the remaining row indices.

In other words, depending on whether {SCS of SS/PBCH block, SCS of PDCCH} is {480, 480} or {960, 960} kHz, all or some of the candidate O values may be defined by applying different scaling factors to the values when {SCS of SS/PBCH block, SCS of PDCCH} is {X, X} kHz (X is any one of {15, 30, 60, 120}). For example, when {SCS of SS/PBCH block, SCS of PDCCH} is {480, 480} kHz, all or some of the candidate O values may be defined as a value obtained by multiplying 0.5 by the value when {SCS of SS/PBCH block, SCS of PDCCH} is {X, X} kHz. As another example, when {SCS of SS/PBCH block, SCS of PDCCH} is {960, 960}kHz, all or some of the candidate O values may be defined as a value obtained by multiplying 0.25 by the value when {SCS of SS/PBCH block, SCS of PDCCH} is {X, X} kHz.

That is, depending on whether {SCS of SS/PBCH block, SCS of PDCCH} is {480, 480} kHz or {960, 960} kHz, all or some of the candidate O values may be defined differently from each other. Here, all or some of the candidate O values may be defined smaller when {SCS of SS/PBCH block, SCS of PDCCH} is {960, 960}kHz than when {SCS of SS/PBCH block, SCS of PDCCH} is {480, 480}kHz. Alternatively, when {SCS of SS/PBCH block, SCS of PDCCH} is {480, 480} kHz or {960, 960} kHz, all or some of the candidate O values may be defined in inverse proportion to {SCS of SS/PBCH block, SCS of PDCCH}. For example, for row indices 2, 3, and 7, specific candidate O values may be defined as 1.25 when {SCS of SS/PBCH block, SCS of PDCCH} is {480, 480} kHz and may be defined as 0.625 when {SCS of SS/PBCH block, SCS of PDCCH} is {960, 960}kHz.

Alternatively, when {SS/PBCH block SCS, CORESET index 0 SCS}={480, 480} kHz or {SS/PBCH block SCS, CORESET index 0 SCS}={960, 960} kHz, as described above, i) different scaling factors K1 and K2 values for each SCS or ii) a common scaling factor K value regardless of SCS may be applied to some O values (e.g. row indexes 2, 3, 7 with an O value of 2.5) in Table 13, and some O values may be substituted with specific values.

For example, when the O value is 2.5 and/or 5 in Table 13 above, a scaling factor (e.g., i) common K=0.5 for 480/960 kHz SCS or ii) K1=0.5 for 480 kHz SCS, K2=0.25 for 960 kHz SCS) may be applied, and when the O value is 7.5, the O value may be substituted with 5. In this case, the O value for each index may be as shown in Table 15 below (or may be interpreted as follows).

Table 15 illustrates parameters for PDCCH monitoring occasions for the Type0-PDCCH CSS set (e.g., in the SS/PBCH block and CORESET multiplexing pattern 1 and FR 2-2) according to an embodiment of the present disclosure.

TABLE 15

| Index | O | Number of search space sets per slot | M | First symbol index |
|---|---|---|---|---|
| 0 | 0 | 1 | 1 | 0 |
| 1 | 0 | 2 | ½ | {0, when i is even}, {7, when i is odd} |
| 2 | 1.25 | 1 | 1 | 0 |
| 3 | 1.25 | 2 | ½ | {0, when i is even}, {7, when i is odd} |
| 4 | 2.5 | 1 | 1 | 0 |
| 5 | 2.5 | 2 | ½ | {0, when i is even}, {7, when i is odd} |
| 6 | 0 | 2 | ½ | { 0, when i is even}, {$N_{symb}^{CORESET}$, when i is odd} |
| 7 | 1.25 | 2 | ½ | {0, when i is even}, {$N_{symb}^{CORESET}$, when i is odd} |
| 8 | 2.5 | 2 | ½ | {0, when i is even}, {$N_{symb}^{CORESET}$, when i is odd} |

TABLE 15-continued

| Index | O | Number of search space sets per slot | M | First symbol index |
|---|---|---|---|---|
| 9 | 5 | 1 | 1 | 0 |
| 10 | 5 | 2 | ½ | {0, when i is even}, {7, when i is odd} |
| 11 | 5 | 2 | ½ | { 0, when i is even}, {$N_{symb}^{CORESET}$, when i is odd} |
| 12 | 0 | 1 | 2 | 0 |
| 13 | 2.5 | 1 | 2 | 0 |
| 14 | Reserved | | | |
| 15 | Reserved | | | |

Referring to Table 15, an O value can be determined based on information for determining a PDCCH monitoring occasion in an MIB (i.e., an index of Table 14) and {SS/PBCH block SCS, CORESET index 0 SCS}. As described above, for example, PDCCH configuration information (e.g., pdcch-ConfigSIB1) in an MIB includes information for determining a PDCCH monitoring occasion (information on the index) and information on a plurality of consecutive RBs and one or more consecutive symbols constituting a CORESET of the Type0-PDCCH CSS set.

Table 15 illustrates a case in which a common scaling factor (e.g., K=0.5 for 480/960 kHz) is applied to some O values and some O values are substituted with a specific value (e.g., 5). However, as described above, different scaling factors for each SCS (e.g., K1=0.5 for 480 kHz SCS and K2=0.25 for 960 kHz) may be applied to some O values.

In other words, depending on whether {SCS of the SS/PBCH block, SCS of the PDCCH} is {480, 480} kHz or {960, 960}kHz, all or some of the candidate O values may be defined by applying different scaling factors to the value when {SCS of the SS/PBCH block, SCS of the PDCCH} is {X, X} kHz (X is any one of {15, 30, 60, 120}). For example, when {SCS of SS/PBCH block, SCS of PDCCH} is {480, 480} kHz, all or some of the candidate O values may be defined as a value obtained by multiplying 0.5 by the value when {SCS of SS/PBCH block, SCS of PDCCH} is {X, X}kHz. As another example, when {SCS of SS/PBCH block, SCS of PDCCH} is {960, 960} kHz, all or some of the candidate O values may be defined as a value obtained by multiplying 0.25 by the value when {SCS of SS/PBCH block, SCS of PDCCH} is {X, X} kHz.

That is, depending on whether {SCS of the SS/PBCH block, SCS of the PDCCH} is {480, 480} kHz or {960, 960} kHz, all or some of the candidate O values may be defined differently from each other. Here, all or some of the candidate O values may be defined smaller when {SCS of SS/PBCH block, SCS of PDCCH} is {960, 960} kHz than when {SCS of SS/PBCH block, SCS of PDCCH} is {480, 480} kHz. Alternatively, when {SCS of SS/PBCH block, SCS of PDCCH} is {480, 480} kHz or {960, 960} kHz, all or some of the candidate O values may be defined in inverse proportion to {SCS of SS/PBCH block, SCS of PDCCH}.

As another example, for a set of O values signaled in Table 13, {0, 2.5, 5, 7.5}, it may be i) substituted (e.g., O=2.5 of row index 2 in Table 13 is changed to another value (e.g., 2.5/K)) or ii) interpreted (e.g., the O=2.5 value of row index 2 in Table 13 itself does not change, and if the corresponding row index 2 is indicated, an actual O value is interpreted as a different value (e.g., 2.5/K)) by one of the following optional methods.

Option 1 (Opt 1): {0, 2.5/K, 5/K, 5}

7.5 in Table 13 may be substituted with or interpreted as 5 (half frame boundary). In addition, 2.5 and 5 in Table 13 may be substituted with or interpreted as 2.5/K and 5/K, respectively. Here, a scaling factor K value may be common (K=2, 4, or 5, etc.) regardless of SCS or may be different values for each SCS (e.g., K=K1 for 480 kHz SCS, K=K2=K1*2 for 960 kHz SCS, K1=2 or 4 or 5). Alternatively, in the option, the O value for each row index in Table 13 can be substituted with or interpreted as one of {0, 2.5/K, 5/K, 5}.

Opt 2: {0, 2.5/K, 5, 7.5/K}

0 and 5 of Table 13 (half frame boundaries) are maintained, and 2.5 and 7.5 of Table 13 may be substituted with or interpreted as 2.5/K and 7.5/K, respectively. Here, a scaling factor K value may be common (K=2, 4, or 5, etc.) regardless of SCS, or may be different values for each SCS (e.g., K=K1 for 480 kHz SCS, K=K2=K1*2 for 960 kHz SCS, K1=2 or 4 or 5). Alternatively, in the option, the O value for each row index in Table 13 may be substituted with or interpreted as one of {0, 2.5/K, 5, 7.5/K}.

Opt 3: {P*0, P*1/4, P*1/2, P*3/4}

In the case of the existing Table 13, P=10, on the other hand, when SCS is 480/960 kHz, the P value may vary. Here, the P value may be common (P=5, 2.5, etc.) regardless of SCS, or different values for each SCS (e.g., P=P1 for 480 kHz SCS, P=P2=P1/2 for 960 kHz SCS, P1=2.5 or 5 or 1.25). If P=2.5 for 480 kHz SCS and P=1.25 for 960 kHz SCS, a set of O values signaled in Table 13, {0, 2.5, 5, 7.5}, may be substituted with or interpreted as {0, 0.625, 1.25, 1.875} in 480 kHz SCS, and may be substituted with or interpreted as {0, 0.3125, 0.625, 0.9375} in 960 kHz SCS. Alternatively, in the option, the O value for each row index in Table 13 may be substituted with or interpreted as one of {P*0, P*1/4, P*1/2, P*3/4}. One of the 4 values proposed by the corresponding option (e.g., P*3/4) may be substituted with 5.

Opt 4: {0, M/K, 5, N/K}

0 and 5 of Table 13 are maintained, and 2.5 and 7.5 of Table 13 may be substituted with or interpreted as M/K and N/K, respectively. While maintaining the half frame boundaries of 0 and 5, values between them can be designated as M and N. For example, {M, N} may be one of {1.25, 2.5}, {0.5, 1}, {1.5, 3}, {1.5, 3.5}, {1.75, 3.5}, {1, 3}, {2, 3}. Here, a scaling factor K value may be common (K=1, 2, 4, or 5, etc.) regardless of SCS, or may be different values for each SCS (e.g., K=K1 for 480 kHz SCS, K=K2=K1*2 for 960 kHz SCS, K1=1 or 2 or 4 or 5). Alternatively, in the corresponding option, the O value for each row index in Table 13 may be substituted with or interpreted as one of {0, M/K, 5, N/K}.

Opt 5: {0, 0.25/K, 0.5/K, 1/K}

In the case of K=1 and 480 kHz SCS, the O value is set to 0.25 (or 0.5 or 1) so that CORESET #0 can be transmitted in a slot immediately after transmission of 16 (or 32 or 64) SS/PBCH blocks. Here, a scaling factor K value may be common (K=1, 2, 4, or 5, etc.) regardless of SCS, or may be different values for each SCS (e.g., K=K1 for 480 kHz SCS, K=K2=K1*2 for 960 kHz SCS, K1=1 or 2 or 4 or 5). Here, characteristically, the K value in 480 kHz SCS may be 1, and the K value in 960 kHz SCS may be 2. Alternatively, in the option, the O value for each row index in Table 13 can be substituted with or interpreted as one of {0, 0.25/K, 0.5/K, 1/K}.

The O value adjusted through the corresponding method may substituted with the O value on the existing row index as in the above examples, and the adjusted O value may be additionally signaled through a reserved index.

Figure 14:
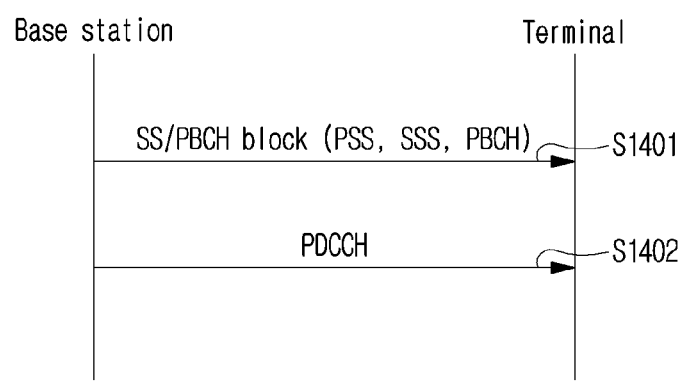
FIG. 14 is a diagram illustrating a signaling procedure between a base station and a terminal for a method for transmitting and receiving a PDCCH according to an embodiment of the present disclosure.

FIG. 14 is a diagram illustrating a signaling procedure between a base station and a terminal for a method for transmitting and receiving a PDCCH according to an embodiment of the present disclosure.

FIG. 14 illustrates a signaling procedure between a user equipment (UE) and a base station (BS) based on the method proposed above (e.g., any one or a plurality of combinations of Embodiments 1 and 2 and detailed embodiments thereof). The example of FIG. 14 is for convenience of description and does not limit the scope of the present disclosure. Some step(s) illustrated in FIG. 14 may be omitted depending on circumstances and/or settings. In addition, the base station and the UE in FIG. 14 are only examples, and may be implemented as the device illustrated in FIG. 17 below. For example, the processor 102/202 of FIG. 17 may control transmission and reception of channels/signals/data/information, etc. using the transceiver 106/206, and may control to store transmitted or received channels/signals/data/information, etc. in the memory 104/204.

In addition, in the operation between the base station and the terminal of FIG. 14, the above-described contents may be referenced/used even if there is no separate mention.

A base station may be a general term for objects that transmit and receive data to and from a terminal. For example, the base station may be a concept including one or more transmission points (TPs), one or more transmission and reception points (TRPs), etc. Also, a TP and/or a TRP may include a panel of a base station, a transmission and reception unit, etc. In addition, "TRP" may be applied by being replaced with an expression such as a panel, an antenna array, a cell (e.g., macro cell/small cell/pico cell, etc.), a transmission point (TP), a base station (base station, gNB, etc.), etc. As described above, TRPs may be classified according to information (e.g., index, ID) on a CORESET group (or CORESET pool). For example, when one UE is configured to transmit/receive with multiple TRPs (or cells), this may mean that multiple CORESET groups (or CORESET pools) are configured for one UE. Configuration of such a CORESET group (or CORESET pool) may be performed through higher layer signaling (e.g., RRC signaling, etc.).

Referring to FIG. 14, for convenience of description, signaling between one base station and a UE is considered, however the corresponding signaling scheme may be extended and applied to signaling between multiple TRPs and multiple UEs. In the following description, a base station may be interpreted as one TRP. Alternatively, a base station may include a plurality of TRPs, or may be one cell including a plurality of TRPs.

Referring to FIG. 14, a UE receives an SS/PBCH block (or SSB) including a PSS, an SSS, and a PBCH from a base station (S1401). That is, a base station transmits an SS/PBCH block (or SSB) including a PSS, an SSS, and a PBCH to a UE.

Here, an MIB may be transmitted to a UE in an SS/PBCH block (or a PBCH within an SS/PBCH block).

A UE may check whether there is a CORESET for the Type0-PDCCH CSS based on an MIB in an SS/PBCH block (or a PBCH in an SS/PBCH block). The Type0-PDCCH CSS is a type of a PDCCH search space and can be used to transmit a PDCCH for scheduling an SI message. If there is the Type0-PDCCH CSS, a UE may determine (i) a plurality of contiguous RBs and one or more contiguous symbols constituting a CORESET and/or (ii) a PDCCH occasion (i.e., a time domain location for PDCCH reception) based on information in an MIB (e.g., pdcch-ConfigSIB1). For example, specifically, pdcch-ConfigSIB1 is 8-bit information, (i) may be determined based on MSB (Most Significant Bit) 4 bits, and (ii) may be determined based on LSB (Least Significant Bit) 4 bits.

Here, a CSS set configured by an MIB and monitoring occasions of a PDCCH within a CORESET of the CSS set may be determined by an MIB. Also, an SS/PBCH block and the CORESET may be multiplexed and transmitted in a time domain.

A UE receives a PDCCH from a base station in a PDCCH monitoring occasion determined based on an MIB in an SS/PBCH block (S1402). That is, a base station transmits a PDCCH to a UE in a PDCCH monitoring occasion determined based on an MIB in an SS/PBCH block.

Here, based on i) information for determining a PDCCH monitoring occasion in an MIB (e.g., an index in the table defined according to the method proposed in the present disclosure, such as Tables 14 and 15) and ii) SCS of an SS/PBCH block and SCS of a PDCCH, a value of a first parameter (i.e., a value of 0) used to determine a PDCCH monitoring occasion may be configured among candidate values of a first parameter. For example, among a plurality of tables (e.g., Tables 14, 15, etc.) defined according to the method proposed in the present disclosure, which table is applied may be determined based on SCS of an SS/PBCH block and SCS of a PDCCH. In addition, a specific row may be configured for a UE in a table (e.g., Tables 14 and 15) defined according to the method proposed in the present disclosure according to information (e.g., an index) for determining a PDCCH monitoring occasion configured in an MIB. Also, PDCCH monitoring occasions may be determined based on parameters of a corresponding row. Here, in particular, as a first parameter (i.e., a value of 0), one value belonging to a row determined according to the index among candidate values of a first parameter (i.e., a value of 0) defined in the table (e.g., Tables 14 and 15) defined according to the method proposed in the present disclosure may be configured for a UE.

Here, when {SS/PBCH block SCS, CORESET index 0 SCS}={480, 480} kHz or {SS/PBCH block SCS, CORESET index 0 SCS}={960, 960} kHz, candidate values for a first parameter may be defined according to the method proposed in the present disclosure.

Here, according to the previous embodiment, depending on whether {SCS of the SS/PBCH block, SCS of the PDCCH} is {480, 480} kHz or {960, 960} kHz, all or some of the candidate values (i.e., candidate O values) of a first parameter may be defined differently from each other. For example, all or some of candidate values (i.e., candidate O values) of a first parameter may be defined smaller when {SCS of SS/PBCH block, SCS of PDCCH} is {960, 960} kHz than when {SCS of SS/PBCH block, SCS of PDCCH} is {480, 480} kHz. Alternatively, when {SCS of SS/PBCH block, SCS of PDCCH} is {480, 480} kHz or {960, 960} kHz, all or some of candidate values (i.e., candidate O values) of a first parameter may be defined in inverse proportion to {SCS of SS/PBCH block, SCS of PDCCH}. For example, when {SCS of SS/PBCH block, SCS of PDCCH} is {X, X} kHz (X is any one of {15, 30, 60, 120}) (e.g., Table 13), for row indexes 2, 3, and 7 where the O value is 2.5, it can be defined as 1.25 when {SCS of SS/PBCH block, SCS of PDCCH} is {480, 480} kHz, and it can be defined as 0.625 when {SCS of SS/PBCH block, SCS of PDCCH} is {960, 960} kHz.

In other words, depending on whether {SCS of SS/PBCH block, SCS of PDCCH} is {480, 480} kHz or {960, 960} kHz, all or some of the candidate O values may be defined by applying different scaling factors to the value when {SCS of SS/PBCH block, SCS of PDCCH} is {X, X} kHz (X is any one of {15, 30, 60, 120}). For example, when {SCS of SS/PBCH block, SCS of PDCCH} is {480, 480} kHz, all or some of the candidate O values may be defined as a value obtained by multiplying 0.5 by a value when {SCS of SS/PBCH block, SCS of PDCCH} is {X, X} kHz. As another example, when {SCS of SS/PBCH block, SCS of PDCCH} is {960, 960} kHz, all or some of the candidate O values may be defined as a value obtained by multiplying 0.25 by a value when {SCS of SS/PBCH block, SCS of PDCCH} is {X, X} kHz.

For example, only when the O value is 2.5 and/or 5 when {SCS of SS/PBCH block, SCS of PDCCH} is {X, X} kHz (X is any one of {15, 30, 60, 120}), a scaling factor may be applied (e.g., i) K=0.5 common for 480/960 kHz SCS or ii) K1=0.5 for 480 kHz SCS, K2=0.25 for 960 kHz SCS). For example, when {SCS of SS/PBCH block, SCS of PDCCH} is {X, X} kHz (X is any one of {15, 30, 60, 120}) (e.g., Table 13), for row indices 2, 3, and 7 with an O value of 2.5, it may be defined as 1.25 (i.e., scaling factor K1=0.5 is applied) when {SCS of SS/PBCH block, SCS of PDCCH} is {480, 480} kHz, and it may be defined as 0.625 (i.e., scaling factor K1=0.25 is applied) when {SCS of SS/PBCH block, SCS of PDCCH} is {960, 960} kHz.

Here, candidate values for a first parameter when {SCS of SS/PBCH block, SCS of PDCCH} are {X, X} kHz (X is any one of {15, 30, 60, 120}) may correspond to Table 13.

Meanwhile, although not shown, {SCS of SS/PBCH block, SCS of PDCCH} may be configured by higher layer signaling by a base station.

A UE may receive/detect DCI through a PDCCH received in PDCCH monitoring occasions determined according to the above method. In addition, system information may be received through a PDSCH scheduled by DCI.

Figure 15:
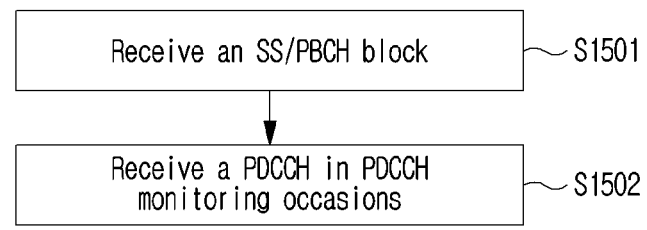
FIG. 15 is a diagram illustrating an operation of a terminal for a method for transmitting and receiving a PDCCH according to an embodiment of the present disclosure.

FIG. 15 is a diagram illustrating an operation of a terminal for a method for transmitting and receiving a PDCCH according to an embodiment of the present disclosure.

FIG. 15 illustrates an operation of a UE based on the method proposed above (e.g., any one or a plurality of combinations of Embodiments 1 and 2 and detailed embodiments thereof). The example of FIG. 15 is for convenience of description and does not limit the scope of the present disclosure. Some step(s) illustrated in FIG. 15 may be omitted depending on circumstances and/or settings. In addition, the UE in FIG. 15 is only examples, and may be implemented as the device illustrated in FIG. 17 below. For example, the processor 102/202 of FIG. 17 may control transmission and reception of channels/signals/data/information, etc. (e.g., RRC signaling, MAC CE, DCI for UL/DL scheduling, SRS, PDCCH, PDSCH, PUSCH, PUCCH, etc.) using the transceiver 106/206, and may control to store transmitted or received channels/signals/data/information, etc. in the memory 104/204.

A UE receives an SS/PBCH block (or SSB) including a PSS, an SSS, and a PBCH from a base station (S1501).

Here, an MIB may be transmitted to a UE in an SS/PBCH block (or a PBCH within an SS/PBCH block).

A UE may check whether there is a CORESET for the Type0-PDCCH CSS based on an MIB in an SS/PBCH block (or a PBCH in an SS/PBCH block). The Type0-PDCCH CSS is a type of a PDCCH search space and can be used to transmit a PDCCH for scheduling an SI message. If there is the Type0-PDCCH CSS, a UE may determine (i) a plurality of contiguous RBs and one or more contiguous symbols constituting a CORESET and/or (ii) a PDCCH occasion (i.e., a time domain location for PDCCH reception) based on information in an MIB (e.g., pdcch-ConfigSIB1). For example, specifically, pdcch-ConfigSIB1 is 8-bit information, (i) may be determined based on MSB (Most Significant Bit) 4 bits, and (ii) may be determined based on LSB (Least Significant Bit) 4 bits.

Here, a CSS set configured by an MIB and monitoring occasions of a PDCCH within a CORESET of the CSS set may be determined by an MIB. Also, an SS/PBCH block and the CORESET may be multiplexed and transmitted in a time domain.

A UE receives a PDCCH from a base station in a PDCCH monitoring occasion determined based on an MIB in an SS/PBCH block (S1502).

Here, based on i) information for determining a PDCCH monitoring occasion in an MIB (e.g., an index in the table defined according to the method proposed in the present disclosure, such as Tables 14 and 15) and ii) SCS of an SS/PBCH block and SCS of a PDCCH, a value of a first parameter (i.e., a value of O) used to determine a PDCCH monitoring occasion may be configured among candidate values of a first parameter. For example, among a plurality of tables (e.g., Tables 14, 15, etc.) defined according to the method proposed in the present disclosure, which table is applied may be determined based on SCS of an SS/PBCH block and SCS of a PDCCH. In addition, a specific row may be configured for a UE in a table (e.g., Tables 14 and 15) defined according to the method proposed in the present disclosure according to information (e.g., an index) for determining a PDCCH monitoring occasion configured in an MIB. Also, PDCCH monitoring occasions may be determined based on parameters of a corresponding row. Here, in particular, as a first parameter (i.e., a value of O), one value belonging to a row determined according to the index among candidate values of a first parameter (i.e., a value of O) defined in the table (e.g., Tables 14 and 15) defined according to the method proposed in the present disclosure may be configured for a UE.

Here, when {SS/PBCH block SCS, CORESET index 0 SCS}={480, 480} kHz or {SS/PBCH block SCS, CORESET index 0 SCS}={960, 960} kHz, candidate values for a first parameter may be defined according to the method proposed in the present disclosure.

Here, according to the previous embodiment, depending on whether {SCS of the SS/PBCH block, SCS of the PDCCH} is {480, 480} kHz or {960, 960} kHz, all or some of the candidate values (i.e., candidate O values) of a first parameter may be defined differently from each other. For example, all or some of candidate values (i.e., candidate O values) of a first parameter may be defined smaller when {SCS of SS/PBCH block, SCS of PDCCH} is {960, 960} kHz than when {SCS of SS/PBCH block, SCS of PDCCH} is {480, 480} kHz. Alternatively, when {SCS of SS/PBCH block, SCS of PDCCH} is {480, 480} kHz or {960, 960} kHz, all or some of candidate values (i.e., candidate O values) of a first parameter may be defined in inverse proportion to {SCS of SS/PBCH block, SCS of PDCCH}. For example, when {SCS of SS/PBCH block, SCS of PDCCH} is {X, X} kHz (X is any one of {15, 30, 60, 120}) (e.g., Table 13), for row indexes 2, 3, and 7 where the O value is 2.5, it can be defined as 1.25 when {SCS of SS/PBCH block, SCS of PDCCH} is {480, 480} kHz, and it can be defined as 0.625 when {SCS of SS/PBCH block, SCS of PDCCH} is {960, 960} kHz.

In other words, depending on whether {SCS of SS/PBCH block, SCS of PDCCH} is {480, 480} kHz or {960, 960} kHz, all or some of the candidate O values may be defined by applying different scaling factors to the value when {SCS of SS/PBCH block, SCS of PDCCH} is {X, X} kHz (X is any one of {15, 30, 60, 120}). For example, when {SCS of SS/PBCH block, SCS of PDCCH} is {480, 480} kHz, all or some of the candidate O values may be defined as a value obtained by multiplying 0.5 by a value when {SCS of SS/PBCH block, SCS of PDCCH} is {X, X} kHz. As another example, when {SCS of SS/PBCH block, SCS of PDCCH} is {960, 960} kHz, all or some of the candidate O values may be defined as a value obtained by multiplying 0.25 by a value when {SCS of SS/PBCH block, SCS of PDCCH} is {X, X} kHz.

For example, only when the O value is 2.5 and/or 5 when {SCS of SS/PBCH block, SCS of PDCCH} is {X, X} kHz (X is any one of {15, 30, 60, 120}), a scaling factor may be applied (e.g., i) K=0.5 common for 480/960 kHz SCS or ii) K1=0.5 for 480 kHz SCS, K2=0.25 for 960 kHz SCS). For example, when {SCS of SS/PBCH block, SCS of PDCCH} is {X, X} kHz (X is any one of {15, 30, 60, 120}) (e.g., Table 13), for row indices 2, 3, and 7 with an O value of 2.5, it may be defined as 1.25 (i.e., scaling factor K1=0.5 is applied) when {SCS of SS/PBCH block, SCS of PDCCH} is {480, 480} kHz, and it may be defined as 0.625 (i.e., scaling factor K1=0.25 is applied) when {SCS of SS/PBCH block, SCS of PDCCH} is {960, 960} kHz.

Here, candidate values for a first parameter when {SCS of SS/PBCH block, SCS of PDCCH} are {X, X} kHz (X is any one of {15, 30, 60, 120}) may correspond to Table 13.

Meanwhile, although not shown, {SCS of SS/PBCH block, SCS of PDCCH} may be configured by higher layer signaling by a base station.

A UE may receive/detect DCI through a PDCCH received in PDCCH monitoring occasions determined according to the above method. In addition, system information may be received through a PDSCH scheduled by DCI.

Figure 16:
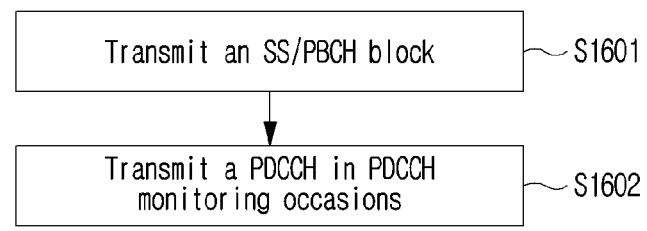
FIG. 16 is a diagram illustrating an operation of a base station for a method for transmitting and receiving a PDCCH according to an embodiment of the present disclosure.

FIG. 16 is a diagram illustrating an operation of a base station for a method for transmitting and receiving a PDCCH according to an embodiment of the present disclosure.

FIG. 16 illustrates an operation of a base station based on the method proposed above (e.g., any one or a plurality of combinations of Embodiments 1 and 2 and detailed embodiments thereof). The example of FIG. 16 is for convenience of description and does not limit the scope of the present disclosure. Some step(s) illustrated in FIG. 16 may be omitted depending on circumstances and/or settings. In addition, the base station in FIG. 16 is only examples, and may be implemented as the device illustrated in FIG. 17 below. For example, the processor 102/202 of FIG. 17 may control transmission and reception of channels/signals/data/information, etc. (e.g., RRC signaling, MAC CE, DCI for UL/DL scheduling, SRS, PDCCH, PDSCH, PUSCH, PUCCH, etc.) using the transceiver 106/206, and may control to store transmitted or received channels/signals/data/information, etc. in the memory 104/204.

A base station transmits an SS/PBCH block (or SSB) including a PSS, an SSS, and a PBCH to a UE (S1601).

Here, an MIB may be transmitted to a UE in an SS/PBCH block (or a PBCH within an SS/PBCH block).

A base station may configure a CORESET for the Type0-PDCCH CSS based on an MIB in an SS/PBCH block (or the PBCH within the SS/PBCH block). The Type0-PDCCH CSS is a type of a PDCCH search space and can be used to transmit a PDCCH for scheduling an SI message. In addition, a base station may configure (i) a plurality of contiguous RBs and one or more contiguous symbols constituting a CORESET and/or (ii) a PDCCH occasion (i.e., a time domain location for PDCCH reception) through information in an MIB (e.g., pdcch-ConfigSIB1). For example, specifically, pdcch-ConfigSIB1 is 8-bit information, (i) may be determined based on MSB (Most Significant Bit) 4 bits, and (ii) may be determined based on LSB (Least Significant Bit) 4 bits.

Here, a CSS set configured by an MIB and monitoring occasions of a PDCCH within a CORESET of the CSS set may be determined by an MIB. Also, an SS/PBCH block and the CORESET may be multiplexed and transmitted in a time domain.

A base station transmits a PDCCH to a UE in a PDCCH monitoring occasion determined based on an MIB in an SS/PBCH block (S1602).

Here, based on i) information for determining a PDCCH monitoring occasion in an MIB (e.g., an index in the table defined according to the method proposed in the present disclosure, such as Tables 14 and 15) and ii) SCS of an SS/PBCH block and SCS of a PDCCH, a value of a first parameter (i.e., a value of O) used to determine a PDCCH monitoring occasion may be configured among candidate values of a first parameter. For example, among a plurality of tables (e.g., Tables 14, 15, etc.) defined according to the method proposed in the present disclosure, which table is applied may be determined based on SCS of an SS/PBCH block and SCS of a PDCCH. In addition, a specific row may be configured for a UE in a table (e.g., Tables 14 and 15) defined according to the method proposed in the present disclosure according to information (e.g., an index) for determining a PDCCH monitoring occasion configured in an MIB. Also, PDCCH monitoring occasions may be determined based on parameters of a corresponding row. Here, in particular, as a first parameter (i.e., a value of O), one value belonging to a row determined according to the index among candidate values of a first parameter (i.e., a value of O) defined in the table (e.g., Tables 14 and 15) defined according to the method proposed in the present disclosure may be configured for a UE.

Here, when {SS/PBCH block SCS, CORESET index 0 SCS}={480, 480} kHz or {SS/PBCH block SCS, CORESET index 0 SCS}={960, 960} kHz, candidate values for a first parameter may be defined according to the method proposed in the present disclosure.

Here, according to the previous embodiment, depending on whether {SCS of the SS/PBCH block, SCS of the PDCCH} is {480, 480} kHz or {960, 960} kHz, all or some of the candidate values (i.e., candidate O values) of a first parameter may be defined differently from each other. For example, all or some of candidate values (i.e., candidate O values) of a first parameter may be defined smaller when {SCS of SS/PBCH block, SCS of PDCCH} is {960, 960} kHz than when {SCS of SS/PBCH block, SCS of PDCCH} is {480, 480} kHz. Alternatively, when {SCS of SS/PBCH block, SCS of PDCCH} is {480, 480} kHz or {960, 960} kHz, all or some of candidate values (i.e., candidate O values) of a first parameter may be defined in inverse proportion to {SCS of SS/PBCH block, SCS of PDCCH}. For example, when {SCS of SS/PBCH block, SCS of PDCCH} is {X, X} kHz (X is any one of {15, 30, 60, 120}) (e.g., Table 13), for row indexes 2, 3, and 7 where the O value is 2.5, it can be defined as 1.25 when {SCS of SS/PBCH block, SCS of PDCCH} is {480, 480} kHz, and it can be defined as 0.625 when {SCS of SS/PBCH block, SCS of PDCCH} is {960, 960} kHz.

In other words, depending on whether {SCS of SS/PBCH block, SCS of PDCCH} is {480, 480} kHz or {960, 960} kHz, all or some of the candidate O values may be defined by applying different scaling factors to the value when {SCS of SS/PBCH block, SCS of PDCCH} is {X, X} kHz (X is any one of {15, 30, 60, 120}). For example, when {SCS of SS/PBCH block, SCS of PDCCH} is {480, 480} kHz, all or some of the candidate O values may be defined as a value obtained by multiplying 0.5 by a value when {SCS of SS/PBCH block, SCS of PDCCH} is {X, X} kHz. As another example, when {SCS of SS/PBCH block, SCS of PDCCH} is {960, 960} kHz, all or some of the candidate O values may be defined as a value obtained by multiplying 0.25 by a value when {SCS of SS/PBCH block, SCS of PDCCH} is {X, X} kHz.

For example, only when the O value is 2.5 and/or 5 when {SCS of SS/PBCH block, SCS of PDCCH} is {X, X} kHz (X is any one of {15, 30, 60, 120}), a scaling factor may be applied (e.g., i) K=0.5 common for 480/960 kHz SCS or ii) K1=0.5 for 480 kHz SCS, K2=0.25 for 960 kHz SCS). For example, when {SCS of SS/PBCH block, SCS of PDCCH} is {X, X} kHz (X is any one of {15, 30, 60, 120}) (e.g., Table 13), for row indices 2, 3, and 7 with an O value of 2.5, it may be defined as 1.25 (i.e., scaling factor K1=0.5 is applied) when {SCS of SS/PBCH block, SCS of PDCCH} is {480, 480} kHz, and it may be defined as 0.625 (i.e., scaling factor K1=0.25 is applied) when {SCS of SS/PBCH block, SCS of PDCCH} is {960, 960} kHz.

Here, candidate values for a first parameter when {SCS of SS/PBCH block, SCS of PDCCH} are {X, X} kHz (X is any one of {15, 30, 60, 120}) may correspond to Table 13.

Meanwhile, although not shown, a base station may configure {SS/PBCH block SCS, PDCCH SCS} to a UE through higher layer signaling.

A base station may transmit DCI to a UE through a PDCCH. In addition, a PDSCH may be scheduled through the corresponding DCI, and system information may be transmitted to a UE through the corresponding PDSCH.

General Device to which the Present Disclosure May be Applied

Figure 17:
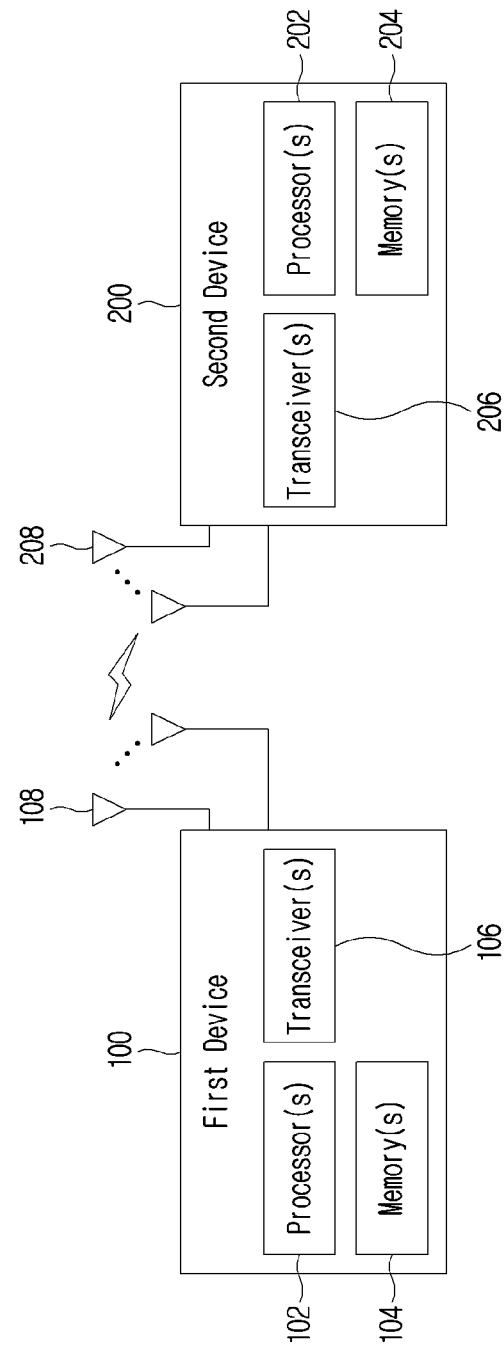
FIG. 17 illustrates a block diagram of a wireless communication device according to an embodiment of the present disclosure.

FIG. 17 is a diagram which illustrates a block diagram of a wireless communication device according to an embodiment of the present disclosure.

In reference to FIG. 17, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/ channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a terminal in a wireless communication system, the method comprising:
receiving a synchronization signal/physical broadcast channel (SS/PBCH) block including a primary synchronization signal (PSS), a secondary synchronization signal (SSS) and a PBCH; and
receiving a physical downlink control channel (PDCCH) on PDCCH monitoring occasions determined based on a master information block (MIB) in the SS/PBCH block,
wherein based on {subcarrier spacing (SCS) of the SS/PBCH block, SCS of the PDCCH}, a value of a first parameter for the PDCCH monitoring occasions is determined, and
wherein only for a value of the first parameter defined as 2.5 when {SCS of the SS/PBCH block, SCS of the PDCCH} is {120, 120} kHz, the value of the first parameter is defined as 1.25 when {SCS of the SS/PBCH block, SCS of the PDCCH} is {480, 480} kHz and defined as 0.625 when {SCS of the SS/PBCH block, SCS of the PDCCH} is {960, 960} kHz.

2. The method of claim 1, wherein some candidate values of the first parameter are defined to be smaller when {SCS of the SS/PBCH block, SCS of the PDCCH} is {960, 960} kHz than when {SCS of the SS/PBCH block, SCS of the PDCCH} is {480, 480} kHz.

3. The method of claim 1, wherein some candidate values of the first parameter are defined to be half when {SCS of the SS/PBCH block, SCS of the PDCCH} is {960, 960} kHz compared to when {SCS of the SS/PBCH block, SCS of the PDCCH} is {480, 480} kHz.

4. The method of claim 1, wherein, depending on whether {SCS of the SS/PBCH block, SCS of the PDCCH} is {480, 480} kHz or {960, 960} kHz, some candidate values of the first parameter are defined by applying different scaling factors to corresponding values when {SCS of the SS/PBCH block, SCS of the PDCCH} are {X, X} kHz (X is one of {15, 30, 60, 120}).

5. The method of claim 4, wherein based on {SCS of the SS/PBCH block, SCS of the PDCCH} being {480, 480} kHz, the scaling factor is 0.5.

6. The method of claim 4, wherein based on {SCS of the SS/PBCH block, SCS of the PDCCH} being {960, 960} kHz, the scaling factor is 0.25.

7. The method of claim 1, wherein monitoring occasions of the PDCCH are determined in a common search space (CSS) set and a control resource set (CORESET) of the CSS set configured by the MIB.

8. The method of claim 7, wherein the SS/PBCH block and the CORESET are multiplexed and transmitted in a time domain.

9. A terminal operating in a wireless communication system, the terminal comprising:
   at least one transceiver for transmitting and receiving a wireless signal; and
   at least one processor for controlling the at least one transceiver,
   wherein the at least one processor configured to:
   receive a synchronization signal/physical broadcast channel (SS/PBCH) block including a primary synchronization signal (PSS), a secondary synchronization signal (SSS) and a PBCH; and
   receive a physical downlink control channel (PDCCH) on PDCCH monitoring occasions determined based on a master information block (MIB) in the SS/PBCH block,
   wherein based on {subcarrier spacing (SCS) of the SS/PBCH block, SCS of the PDCCH}, a value of a first parameter for the PDCCH monitoring occasions is determined, and
   wherein only for a value of the first parameter defined as 2.5 when {SCS of the SS/PBCH block, SCS of the PDCCH} is {120, 120} kHz, the value of the first parameter is defined as 1.25 when {SCS of the SS/PBCH block, SCS of the PDCCH} is {480, 480} kHz and defined as 0.625 when {SCS of the SS/PBCH block, SCS of the PDCCH} is {960, 960} kHz.

10. A base station operating in a wireless communication system, the base station comprising:
    at least one transceiver for transmitting and receiving a wireless signal; and
    at least one processor for controlling the at least one transceiver,
    wherein the at least one processor configured to:
    transmit a synchronization signal/physical broadcast channel (SS/PBCH) block including a primary synchronization signal (PSS), a secondary synchronization signal (SSS) and a PBCH; and
    transmit a physical downlink control channel (PDCCH) on PDCCH monitoring occasions determined based on a master information block (MIB) in the SS/PBCH block,
    wherein based on {subcarrier spacing (SCS) of the SS/PBCH block, SCS of the PDCCH}, a value of a first parameter for the PDCCH monitoring occasions is determined, and
    wherein only for a value of the first parameter defined as 2.5 when {SCS of the SS/PBCH block, SCS of the PDCCH} is {120, 120} kHz, the value of the first parameter is defined as 1.25 when {SCS of the SS/PBCH block, SCS of the PDCCH} is {480, 480} kHz and defined as 0.625 when {SCS of the SS/PBCH block, SCS of the PDCCH} is {960, 960} kHz.

* * * * *